(12) United States Patent
Abou Rjeily

(10) Patent No.: US 8,194,775 B2
(45) Date of Patent: Jun. 5, 2012

(54) METHOD OF DIFFERENTIAL SPACE-TIME CODING

(75) Inventor: Chadi Abou Rjeily, Byblos (LB)

(73) Assignee: Commissariat a l'Energie Atomique, Paris (FR)

( * ) Notice: Subject to any disclaimer, the term of this patent is extended or adjusted under 35 U.S.C. 154(b) by 544 days.

(21) Appl. No.: 12/393,594

(22) Filed: Feb. 26, 2009

(65) Prior Publication Data

US 2009/0225809 A1    Sep. 10, 2009

(30) Foreign Application Priority Data

Mar. 4, 2008 (FR) ..................................... 08 51400

(51) Int. Cl.
*H04B 7/02*    (2006.01)

(52) U.S. Cl. ........ 375/267; 375/130; 375/260; 375/299; 375/340; 375/347; 455/101; 455/132; 455/296; 455/500; 455/562.1; 370/334

(58) Field of Classification Search .................. 375/260, 375/267, 299, 340, 347; 455/101, 132, 296, 455/500, 562.1; 370/334
See application file for complete search history.

(56) References Cited

OTHER PUBLICATIONS

Rjeily et al; "Differential Space-Time Ultra-Wideband Communications" Ultra Wideband, 2005 IEEE International Conference on Zurich, Switzerland May 2008 pp. 248-253.
Rjeily et al; "Space-Time Coding for Multiuser Ultra-Wideband Communications" Internet Citation, URL: http://www.comelec.enst.fr/{belfiore/UWB_MIMO.pdf>.
Reijly et al; "A 2 x 2 Antennas Ultra-Wideband System with Biorthogonal Pulse Position Modulation" IEEE Communications Letters, IEEE Service Center, vol. 10 No. 5, May 5, 2006 pp. 366-368.
Tarokh et al; "A Differential Detectio Scheme for Transmit Diversity" IEEE Journal on Selected Areas in Communications, vol. 18, No. 7, Jul. 2007.
Gao et al; "Bit error probability for space-time block codes with coherent and differential detection" Proc. of Vehicular Technology Conference, vol. 1, pp. 410-414, Sep. 2002.
French Search Report dated Dec. 1, 2008.

*Primary Examiner* — Leon Flores
(74) *Attorney, Agent, or Firm* — Pearne & Gordon LLP

(57) ABSTRACT

The present invention relates to a differential space-time coding of blocks of 2, 4 or 8 information symbols belonging to a 2-PPM modulation alphabet, for a pulse UWB MIMO system with 2, 4 or 8 transmitter antennas. The proposed differential space-time code does not introduce an inversion of the polarity of the pulses, whilst offering maximum diversity and a unit rate.
The invention also relates to a pulse UWB transmitter system with 2, 4, or 8 antennas which uses this differential space-time coding, as well as an associated receiver system which does not require channel estimation.

14 Claims, 8 Drawing Sheets

TH-UWB $c_k(n) = 7,1,4,7$ $T_s$ $T_c$

DS-UWB $b_n^{(k)} = +1,-1,+1,-1$

TH-DS-UWB

METHOD OF DIFFERENTIAL SPACE-TIME CODING

TECHNICAL FIELD

The present invention relates to the field of space-time coding (or STC) for multi-antenna systems, in particular for applications in Ultra-Wide Band (or UWB) telecommunications.

THE EXISTING STATE OF THE TECHNIQUE

Multi-antenna type wireless communication systems are well known in the state of the art. These systems use multiple transmitter and/or receiver antennas and are called, depending on the type of configuration adopted, MIMO (Multiple Input Multiple Output), MISO (Multiple Input Single Output) or SIMO (Single Input Multiple Output). In what follows we will employ the one term MIMO to include the aforementioned MIMO and MISO variants. The use of spatial diversity at the transmission and/or the reception side enables these systems to offer channel capacities which are significantly greater than those for conventional single-antenna systems (or SISO—Single Input Single Output). This spatial diversity is generally supplemented by time diversity by means of space-time coding. In such a coding, an information symbol to be transmitted is coded over several antennas and over several transmission instants.

A first type of space-time codes comprises STBC (Space Time Block Coding) codes or coding using blocks In a multi-antenna system which uses coding by blocks, a block of information symbols to be transmitted is coded into a transmission symbol matrix, with one dimension of the matrix corresponding to the number of antennas and the other corresponding to the consecutive transmission instants.

FIG. 1 shows a schematic representation of a MIMO transmitter system 100 with STBC coding. A block of information symbols $\sigma=(\sigma_1, \ldots, \sigma_b)$, or example a binary word of b bits or more generally of b M-ary symbols is coded in a space-time matrix:

$$C = \begin{pmatrix} c_{1,1} & c_{1,2} & \cdots & c_{1,P} \\ c_{2,1} & c_{2,2} & \cdots & c_{2,P} \\ \vdots & \vdots & \ddots & \vdots \\ c_{T,1} & c_{T,2} & \cdots & c_{T,P} \end{pmatrix} \quad (1)$$

where the coefficients $c_{t,p}$, $t=1, \ldots, T$; $p=1, \ldots, P$ of the code are in general complex coefficients which depend on the information symbols, P is the number of antennas used for transmission, T is a whole number indicating the temporal extension of the code, that is, the number of uses of the channel or PCUs (Per Channel Use). A space-time code is said to be real if the coefficients $c_{t,p}$ are real, it is said to be linear if the coding function which transforms the information symbols $\sigma$ into the space-time matrix C is linear.

In FIG. 1, a space-time coder is designated by 110. At each instant of use of the channel t, the coder supplies the multiplexer 120 with the t-th row vector of the matrix C. The multiplexer transmits to the modulators $130_1, \ldots, 130_P$ the coefficients of the row vector and the modulated signals are transmitted by the antennas $140_1, \ldots, 140_P$.

The space-time code is characterised by its rate, that is, by the number of information symbols which it transmits per instant of channel use (PCU). The code is called full rate if it is P times greater than the rate for a single antenna (SISO) use.

A code is said to be at unit rate if it is the same as the one corresponding to the use of a single antenna.

Furthermore, the space-time code is characterised by its diversity, which may be defined as the rank of the matrix C. Maximum diversity is obtained if, for any two code words $C_1$ and $C_2$ respectively which corresponding to two vectors $S_1$ and $S_2$, the matrix $C_1-C_2$ is full rank.

Finally, the space-time code is characterised by its coding gain which represents the minimum distance between different code words. It can be defined as:

$$\min_{C_1 \neq C_2} \det((C_1 - C_2)^H(C_1 - C_2)) \quad (2)$$

or, in an equivalent manner, for a linear code:

$$\min_{C \neq 0} \det(C^H C) \quad (3)$$

Where det(C) represents the determinant of C, and $C^H$ is the transposed conjugated matrix of C. For one transmission energy per information symbol, the coding gain is limited. The higher the coding gain of a space-time code, the more resistant to fading it will be.

However, the decoding of STBC codes is achieved in a coherent manner, which generally assumes an estimation of the channel being carried out on reception, that is, determination of the matrix H of complex propagation coefficients between the transmitter antenna and the receiver antennas. This channel estimation is made possible through sequences of pilot symbols being sent by the transmitter system, which reduces the average payload of the blocks of information symbols accordingly. Moreover, this estimation must be carried out frequently in the case of a transmission channel which exhibits a low signal to noise ratio or rapid fluctuations.

In order to avoid having to carry out a channel estimation, it was proposed, in the article by V. Tarokh et al, entitled "A differential detection scheme for transmit diversity" published in the IEEE Journal on Selected Areas in Communications, Vol. 18, No. 7, July 2000, pages 1169-1174, to use differential space-time coding. This type of coding was described in an equivalent manner in matrix form in the article by C. Gao et al entitled "Bit error probability for space-time block codes with coherent and differential detection" published in Proc. Of Vehicular Technology Conference, Vol. 1, pages 410-414, September 2002, pages 410-414.

The differential space-time coding described in the aforementioned articles is limited to the case of an MISO system with P=2 transmitter antennas and information systems which belong to a PSK modulation constellation. Unlike a conventional STBC coding, the matrix of the differential space-time code for a given block depends not only on the information symbols in the block but also on the space-time code for the preceding block. More precisely, if the successive blocks of information symbols are denoted $\sigma_k$ where k is a time index which corresponds to the block time, equal to two symbol times, the matrix of the code $C_k$ for a current block $\sigma_k=(\sigma_{1,k}, \sigma_{2,k})$ is given by the recurrence relationship:

$$C_k = S_k C_{k-1} \quad (4)$$

and the provision of an initial matrix $C_0$, where $$S_k = \begin{pmatrix} \sigma_{1,k} & \sigma_{2,k} \\ -\sigma_{2,k}^* & \sigma_{1,k}^* \end{pmatrix}$$

and $$C_{k-1} = \begin{pmatrix} C_{1,k-1} & C_{2,k-1} \\ -C_{2,k-1}^* & C_{1,k-1}^* \end{pmatrix}$$

correspond to the matrix of the code for the preceding block $\sigma_{k-1}$.

If $r_{k,1}$ and $r_{k,2}$ are the scalar values which correspond to the signals received by the receiver during the first symbol time and the second symbol time of the block $\sigma_k$ and if the following matrices are constructed:

$$R_k = \begin{pmatrix} r_{1,k} & r_{2,k} \\ -r_{2,k}^* & r_{1,k}^* \end{pmatrix}, R_{k-1} = \begin{pmatrix} r_{1,k-1} & r_{2,k-1} \\ -r_{2,k-1}^* & r_{1,k-1}^* \end{pmatrix} \quad (5)$$

the receiver estimates the transmitted symbols using:

$$(\hat{\sigma}_{1,k}, \hat{\sigma}_{2,k}) = \underset{\sigma_{1,k};\sigma_{2,k}}{\mathrm{Argmax}}(Tr(S_k^H R_k R_{k-1}^H)) \quad (6)$$

where Tr(X) is the trace of the matrix X.

It will be noted that the estimation of $\sigma_{1,k}, \sigma_{2,k}$ in the expression (6) does not involve the use of the transmission channel matrix H.

In FIG. 2 is a representation of a MIMO transmitter system 200 with differential space-time coding. The space-time coder 210 receives blocks of information symbols $\sigma_k$, calculates the matrix $C_k$ at each block time ($\tau_B$) and in this time interval transmits a row vector of $C_k$ to the multiplexer 230 at each time-symbol ($\tau_S$, where $\tau_B=2\tau_S$). A delay loop 225 is shown to represent the recurrence (4). The delay element 225 stores the row vectors to provide the matrix $C_{k-1}$ during the coding of the block $\sigma_k$. As before, the multiplexer 220 transmits the coefficients of the row vector to the modulators $230_1, 230_2$. The signals thus modulated are transmitted by the antennas $240_2, 240_2$.

Another telecommunications field has recently been the subject of considerable research. This involves UWB telecommunications systems, expected to play a part in particular in the development of future wireless personal networks (WPAN). A specific characteristic of these systems is that they operate directly in baseband with ultra wide band signals. In general terms what is meant by a UWB signal is a signal that conforms to a spectral mask stipulated in the FCC regulation of 14 Feb. 2002 and revised in March 2005, that is to say, essentially a signal in the spectral band 3.1 to 10.6 GHz and which exhibits a bandwidth of at least 500 MHz at −10 dB. In practice, there are known two types of UWB signals; multi-band OFDM (MB-OFDM) and pulse-type UWB signals. Only the latter will be considered hereinafter.

A pulse UWB signal is made up of very short pulses, typically of the order of a few hundred picoseconds, distributed within a frame. In order to reduce multiple-access interference (MAI—Multiple Access Interference) a distinct time-hopping code (TH) is assigned to each user. The signal issued by or sent to a user k can then be written in the form:

$$s_k(t) = \sum_{n=0}^{N_s-1} w(t - nT_s - c_k(n)T_c) \quad (7)$$

where w is the form of the elementary pulse, $T_c$ is a chip time, $T_s$ is the duration of an elementary interval with $N_s=N_cT_c$ where $N_c$ is the number of chips in an interval, with the total frame being of duration $T_f=N_sT_s$ where $N_s$ is the number of intervals in the frame. The duration of the elementary pulse is chosen to be less than the chip time, that is $T_w \leq T_c$. The sequence $c_k(n)$ for n=0, . . . , $N_s$−1 defines the user k's time hopping code. The sequences of time hops are chosen so as to minimise the number of collisions between pulses which belong to different users' time hopping sequences.

Represented in FIG. 3A is a TH-UWB signal associated with a user k. In order to transmit a given information symbol from or to a user k, the TH-UWB signal is generally modulated using position modulation, that is, for the modulated signal $$s_k(t) = \sum_{n=0}^{N_s-1} w(t - nT_s - c_k(n)T_c - \mu_k \varepsilon) \quad (8)$$

where $\varepsilon$ is a modulation delay (dither) significantly smaller than the chip time and $\mu_k \in \{0, \ldots, M-1\}$ is the M-ary PPM position of the symbol.

Alternatively, information symbols may be transmitted using amplitude modulation (PAM). In this case, the modulated signal may be given as:

$$s_k(t) = \sum_{n=0}^{N_s-1} a^{(k)} \cdot w(t - nT_s - c_k(n)T_c) \quad (9)$$

where $a^{(k)}=2m'-1-M'$ with m'=1, . . . , M', is the M'-ary symbol of the PAM modulation. For example a BPSK (M'=2) modulation could be used.

PPM and PAM modulations may also be combined into a composite M.M'-ary modulation. The modulated signal then has the following general form:

$$s_k(t) = \sum_{n=0}^{N_s-1} \sum_{m=0}^{M-1} a_m^{(k)} \cdot w(t - nT_s - c_k(n)T_c - m\varepsilon) \quad (10)$$

where the $a_m^{(k)}$ elements are the elements in a M-PPM-M'-PAM modulation alphabet of cardinal Q=M.M'. This alphabet has been represented in FIG. 4. For each of the M time positions, M' modulation amplitudes are possible. A symbol (μ,a) from this alphabet may be represented by a sequence $a_m$, m=0, . . . , M−1 with $a_m=\delta(m-\mu)a$ where μ is a position of the PPM modulation, a is a component of the M'-PAM alphabet and δ(.) the Dirac distribution.

Instead of separating the various users using time-hopping codes, they can also be separated using orthogonal codes, for example Hadamard codes as in DS-CDMA. This is then known as DS-UWB (Direct Spread UWB). In this case the expression for the non-modulated signal, corresponding to (7) is:

$$s_k(t) = \sum_{n=0}^{N_s-1} b_n^{(k)} w(t - nT_s) \quad (11)$$

where $b_n^{(k)}$, n=0, ..., $N_s$−1 is the spectrum spreading sequence for user k. It can be seen that the expression (11) is analogous to that of a conventional DS-CDMA signal. It differs from it by the fact that the chips do not occupy the entire frame but are spread at an interval $T_s$. Represented in FIG. 3B is a DS-UWB signal associated with a user k.

As before, information symbols may be transmitted using PPM amplitude modulation. The position modulated DS-UWB signal corresponding to the TH-UWB signal (8) may be expressed, keeping the same notation, as:

$$s_k(t) = \sum_{n=0}^{N_s-1} b_n^{(k)} \cdot w(t - nT_s - \mu_k \varepsilon) \quad (12)$$

Finally, it is known to combine time hopping and spectral spreading codes to offer multiple access to various users. A TH-DS-UWB pulse UWB signal is thus obtained whose general form is:

$$s_k(t) = \sum_{n=0}^{N_s-1} b_n^{(k)} \cdot w(t - nT_s - c_k(n)T_c) \quad (13)$$

Represented in FIG. 3C is a TH-DS-UWB signal associated with a user k. This signal may itself be modulated using M-PPM-M'-PAM modulation, as in (10). The following, therefore, is obtained for the modulated signal:

$$s_k(t) = \sum_{n=0}^{N_s-1} \sum_{m=0}^{M-1} a_m^{(k)} b_n^{(k)} \cdot w(t - nT_s - c_k(n)T_c - m\varepsilon) \quad (14)$$

The use of UWB signal in MIMO systems is known in the state of the art. In this case, each antenna transmits a UWB signal, modulated as a function of an information symbol or of a block of such symbols (STBC).

In the article by C. Abou-Rjeily et al. entitled "Differential space-time ultra-wideband communications" published in Proc. of IEEE Conference on Ultra-Wide Band, Zurich, September 2005, pages 248-253, it was proposed to use a differential space-time code to modulate UWB signals in an MIMO system with two transmitter antennas. The information symbols belong to a M-PPM-M'-PAM modulation alphabet. If a block of such symbols is called $\sigma_k=(\sigma_{k,1},\sigma_{k,2})$ where $\sigma_{k,1}=s_{k,1}v(d_{k,1})$, $\sigma_{k,2}=s_{k,2}v(d_{k,2})$; $v(d_{k,1})$, $v(d_{k,2})$ are vectors of dimension M whose components are, respectively $\delta(m-d_{k,1})$, m=0, ..., M−1 and $\delta(m-d_{k,2})$, m=0, ..., M−1 where $\delta$ is the Dirac symbol. The space-time code is then defined by the matrix of size 2M×2:

$$C_k = \begin{pmatrix} a_{k,1}v(\mu_{k,1}) & a_{k,2}v(\mu_{k,1}) \\ -a_{k,2}v(\mu_{k,2}) & a_{k,1}v(\mu_{k,2}) \end{pmatrix} \quad (15)$$

where $v(\mu_{k,1})$ and $v(\mu_{k,2})$ are vectors of dimension M whose respective components are $\delta(m-\mu_{k,1})$ m=0, ..., M−1, and $\delta(m-\mu_{k,2})$, m=0, ..., M−1. The matrix $C_k$ of the code is calculated using recurrence relationships:

$$A_k = S_k A_{k-1} \quad (16)$$

$$\mu_{k,i} = d_{k,i} + \mu_{k-1,i} \bmod M \quad (17)$$

where mod M represents the modulo M operation and $$A_k = \begin{pmatrix} a_{k,1} & a_{k,2} \\ -a_{k,2} & a_{k,1} \end{pmatrix}; \quad (18)$$

$$A_{k-1} = \begin{pmatrix} a_{k-1,1} & a_{k-1,2} \\ -a_{k-1,2} & a_{k-1,1} \end{pmatrix};$$

$$S_k = \begin{pmatrix} s_{k,1} & s_{k,2} \\ -s_{k,2} & s_{k,1} \end{pmatrix}$$

The elements of the space-time code (15) are symbols whose respective amplitudes are given by the recurrence relationship (16), and their respective PPM positions by the recurrence relationship (17.)

In the particular case of information symbols which belong to a modulation alphabet M-PPM, that is for M'=0, the consequence of the sign inversions occurring in the matrices (18) is that the elements of the space-time code may have negative amplitudes and consequently do not belong to the M-PPM alphabet. The result of this is that the UWB signals modulated by the space-time code contain signed pulses. Given the very brief duration of these pulses and therefore the very wide UWB pulse signal band, it is excessively difficult to recover phase information item on reception, and in particular to detect a sign inversion. Furthermore, certain MIMO systems lend themselves poorly, if not at all, to the transmission of signed pulses. For example, optical UWB MIMO systems only transmit TH-UWB light intensity signals, which are naturally void of sign information.

The purpose of the present invention is therefore to propose a differential space-time code for an MIMO system which uses pulse UWB signals which do not rely on the transmission of signed pulses. A subsidiary purpose of the present invention is to propose a UWB MIMO transmitter system which uses the said space-time code, as well as an associated receiver system.

PRESENTATION OF THE INVENTION

According to a first embodiment, the invention is defined by a differential space-time coding process for a UWB transmitter system with two radiative elements, where the said procedure codes a block $\sigma_k=(s_{k,1},s_{k,2})$ of information symbols which belong to a 2-PPM modulation alphabet, in a sequence of two vectors with two components, with the components of a vector being intended to position modulate a pulse UWB signal for a radiative element of the said system and a given transmission channel use, with each component corresponding to one PPM modulation position The said vectors are obtained from elements of the code matrix:

$$C_k = \begin{pmatrix} c_{k,1} & c_{k,2} \\ c_{k,2}\Omega & c_{k,1} \end{pmatrix}$$

where $C_k=\text{sgn}(C_k^\circ-[\text{Min}(C_k^\circ)\otimes u_1])$, $C_k^\circ=C_{k-1}S_k$, $u_1=(1\ 1)$, $\otimes$ is the Kronecker product, sgn(X) is the matrix which gives the sign values of the elements of X, the sign value being respectively equal to −1,0,1 if the element is negative, of null value or positive, Min(X) is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} \\ s_{k,1}\Omega & s_{k,2}\Omega \\ s_{k,2}\Omega & s_{k,1} \\ s_{k,2} & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and with $\Omega$ being a permutation of the two PPM modulation positions.

According to a second embodiment, the invention is defined by a differential space-time coding process for a UWB transmitter system with four radiative elements, where the said procedure codes a block $\sigma_k=(s_{k,1}s_{k,2},s_{k,3},s_{k,4})$ of four information symbols which belong to a 2-PPM modulation alphabet, in a sequence of four vectors with two components, with the components of a vector being intended to position modulate a pulse UWB signal for a radiative element of the said system and a given transmission channel use, with each component corresponding to one PPM modulation position. The said vectors are obtained from elements of the code matrix:

$$C_k = \begin{pmatrix} c_{k,1} & c_{k,2} & c_{k,3} & c_{k,4} \\ c_{k,2}\Omega & c_{k,1} & c_{k,4}\Omega & c_{k,3} \\ c_{k,3}\Omega & c_{k,4} & c_{k,1} & c_{k,2}\Omega \\ c_{k,4}\Omega & c_{k,3}\Omega & c_{k,2} & c_{k,1} \end{pmatrix}$$

with $C_k = \text{sgn}(C_k^o - [\text{Min}(C_k^o) \otimes u_1])$, $C_k^o = C_{k-1}S_k$, $u_1 = (1\ 1)$, $\otimes$ is the Kronecker product, $\text{sgn}(X)$ is the matrix which gives the sign values of the elements of X, the sign value being respectively equal to −1,0,1 if the element is negative, of null value or positive, $\text{Min}(X)$ is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} & s_{k,3} & s_{k,4} \\ s_{k,1}\Omega & s_{k,2}\Omega & s_{k,3}\Omega & s_{k,4}\Omega \\ s_{k,2}\Omega & s_{k,1} & s_{k,4}\Omega & s_{k,3} \\ s_{k,2} & s_{k,1}\Omega & s_{k,4} & s_{k,3}\Omega \\ s_{k,3}\Omega & s_{k,4} & s_{k,1} & s_{k,2}\Omega \\ s_{k,3} & s_{k,4}\Omega & s_{k,1}\Omega & s_{k,2} \\ s_{k,4}\Omega & s_{k,3}\Omega & s_{k,2} & s_{k,1} \\ s_{k,4} & s_{k,3} & s_{k,2}\Omega & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions.

According to a third embodiment, the invention is defined by a differential space-time coding process for a UWB transmitter system with eight radiative elements, where the said procedure codes a block $\sigma_k=(s_{k,1},s_{k,2},s_{k,3},s_{k,4},s_{k,5},s_{k,6},s_{k,7},s_{k,8})$ of eight information symbols which belong to a 2-PPM modulation alphabet, in a sequence of eight vectors with two components, with the components of a vector being intended to position modulate a pulse UWB signal for a radiative element of the said system and a given transmission channel use, with each component corresponding to one PPM modulation position. The said vectors are obtained from elements of the code matrix:

$$C_k = \begin{pmatrix} c_{k,1} & c_{k,2} & c_{k,3} & c_{k,4} & c_{k,5} & c_{k,6} & c_{k,7} & c_{k,8} \\ c_{k,2}\Omega & c_{k,1} & c_{k,4} & c_{k,3}\Omega & c_{k,6} & c_{k,5}\Omega & c_{k,8}\Omega & c_{k,7} \\ c_{k,3}\Omega & c_{k,4}\Omega & c_{k,1} & c_{k,2} & c_{k,7} & c_{k,8} & c_{k,5}\Omega & c_{k,6}\Omega \\ c_{k,4}\Omega & c_{k,3} & c_{k,2}\Omega & c_{k,1} & c_{k,8} & c_{k,7}\Omega & c_{k,6} & c_{k,5}\Omega \\ c_{k,5}\Omega & c_{k,6}\Omega & c_{k,7}\Omega & c_{k,8}\Omega & c_{k,1} & c_{k,2} & c_{k,3} & c_{k,4} \\ c_{k,6}\Omega & c_{k,5}\Omega & c_{k,8}\Omega & c_{k,7} & c_{k,2}\Omega & c_{k,1} & c_{k,4}\Omega & c_{k,3} \\ c_{k,7}\Omega & c_{k,8} & c_{k,5} & c_{k,6}\Omega & c_{k,3}\Omega & c_{k,4} & c_{k,1} & c_{k,2}\Omega \\ c_{k,8}\Omega & c_{k,7}\Omega & c_{k,6} & c_{k,5} & c_{k,4}\Omega & c_{k,3}\Omega & c_{k,2} & c_{k,1} \end{pmatrix}$$

where $C_k = \text{sgn}(C_k^o - [\text{Min}(C_k^o) \otimes u_1])$, $C_k^o = C_{k-1}S_k$, $u_1 = (1\ 1)$, $\otimes$ is the Kronecker product, $\text{sgn}(X)$ is the matrix which gives the sign values of the elements of X, the sign value being respectively equal to −1,0,1 if the element is negative, of null value or positive, $\text{Min}(X)$ is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} & s_{k,3} & s_{k,4} & s_{k,5} & s_{k,6} & s_{k,7} & s_{k,8} \\ s_{k,1}\Omega & s_{k,2}\Omega & s_{k,3}\Omega & s_{k,4}\Omega & s_{k,5}\Omega & s_{k,6}\Omega & s_{k,7}\Omega & s_{k,8}\Omega \\ s_{k,2}\Omega & s_{k,1} & s_{k,4} & s_{k,3}\Omega & s_{k,6} & s_{k,5}\Omega & s_{k,8}\Omega & s_{k,7} \\ s_{k,2} & s_{k,1}\Omega & s_{k,4}\Omega & s_{k,3} & s_{k,6}\Omega & s_{k,5} & s_{k,8} & s_{k,7}\Omega \\ s_{k,3}\Omega & s_{k,4}\Omega & s_{k,1} & s_{k,2} & s_{k,7} & s_{k,8} & s_{k,5}\Omega & s_{k,6}\Omega \\ s_{k,3} & s_{k,4} & s_{k,1}\Omega & s_{k,2}\Omega & s_{k,7}\Omega & s_{k,8}\Omega & s_{k,5} & s_{k,6} \\ s_{k,4}\Omega & s_{k,3} & s_{k,2}\Omega & s_{k,1} & s_{k,8} & s_{k,7}\Omega & s_{k,6} & s_{k,5}\Omega \\ s_{k,4} & s_{k,3}\Omega & s_{k,2} & s_{k,1}\Omega & s_{k,8}\Omega & s_{k,7} & s_{k,6}\Omega & s_{k,5} \\ s_{k,5}\Omega & s_{k,6}\Omega & s_{k,7}\Omega & s_{k,8}\Omega & s_{k,1} & s_{k,2} & s_{k,3} & s_{k,4} \\ s_{k,5} & s_{k,6} & s_{k,7} & s_{k,8} & s_{k,1}\Omega & s_{k,2}\Omega & s_{k,3}\Omega & s_{k,4}\Omega \\ s_{k,6}\Omega & s_{k,5} & s_{k,8}\Omega & s_{k,7} & s_{k,2}\Omega & s_{k,1} & s_{k,4}\Omega & s_{k,3} \\ s_{k,6} & s_{k,5}\Omega & s_{k,8} & s_{k,7}\Omega & s_{k,2} & s_{k,1}\Omega & s_{k,4} & s_{k,3}\Omega \\ s_{k,7}\Omega & s_{k,8} & s_{k,5} & s_{k,6}\Omega & s_{k,3}\Omega & s_{k,4} & s_{k,1} & s_{k,2}\Omega \\ s_{k,7} & s_{k,8}\Omega & s_{k,5}\Omega & s_{k,6} & s_{k,3} & s_{k,4}\Omega & s_{k,1}\Omega & s_{k,2} \\ s_{k,8}\Omega & s_{k,7}\Omega & s_{k,6} & s_{k,5} & s_{k,4}\Omega & s_{k,3}\Omega & s_{k,2} & s_{k,1} \\ s_{k,8} & s_{k,7} & s_{k,6}\Omega & s_{k,5}\Omega & s_{k,4} & s_{k,3} & s_{k,2}\Omega & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions.

The invention also relates to a UWB transmitter system with two radiative elements, for implementing the procedure in accordance with the first embodiment. This transmitter system includes:

coding means for coding a block $\sigma_k=(s_{k,1},s_{k,2})$ of two information symbols which belong to a 2-PPM modulation alphabet, in a sequence of two vectors with two components, with the components of a vector being intended to position modulate a pulse UWB signal for a radiative element of the said system and a given transmission channel use, with each component corresponding to one PPM modulation position, with the coding means obtaining the said vectors from elements of the code matrix:

$$C_k = \begin{pmatrix} c_{k,1} & c_{k,2} \\ c_{k,2}\Omega & c_{k,1} \end{pmatrix}$$

where $C_k = \mathrm{sgn}(C_k^o - [\mathrm{Min}(C_k^o) \otimes u_1])$, $C_k^o = C_{k-1} S_k$, $u_1 = (1\ 1)$, $\otimes$ is the Kronecker product, $\mathrm{sgn}(X)$ is the matrix which gives the sign values of the elements of X, the sign value being respectively equal to −1,0,1 if the element is negative, of null value or positive, $\mathrm{Min}(X)$ is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} \\ s_{k,1}\Omega & s_{k,2}\Omega \\ s_{k,2}\Omega & s_{k,1} \\ s_{k,2} & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions;

two modulators for position modulating a pulse UWB signal, where each modulator is associated with a radiative element and modulates the said signal position, during a use of the transmission channel, by using the components of the vector associated with the said radiative element and with the said use of the channel;

where each radiative element is suitable for transmitting the signal thus modulated by said associated modulator.

The invention also relates to a UWB transmitter system with four radiative elements, for implementing the procedure in accordance with the second embodiment. This transmitter system includes:

coding means for coding a block $\sigma_k = (s_{k,1}, s_{k,2}, s_{k,3}, s_{k,4})$ of four information symbols which belong to a 2-PPM modulation alphabet, in a sequence of four vectors with two components, with the components of a vector being intended to position modulate a pulse UWB signal for a given radiative element of the said system and a given transmission channel use, with each component corresponding to one PPM modulation position, with the coding means obtaining said vectors from elements of the code matrix:

$$C_k = \begin{pmatrix} c_{k,1} & c_{k,2} & c_{k,3} & c_{k,4} \\ c_{k,2}\Omega & c_{k,1} & c_{k,4}\Omega & c_{k,3} \\ c_{k,3}\Omega & c_{k,4} & c_{k,1} & c_{k,2}\Omega \\ c_{k,4}\Omega & c_{k,3}\Omega & c_{k,2} & c_{k,1} \end{pmatrix}$$

where $C_k = \mathrm{sgn}(C_k^o - [\mathrm{Min}(C_k^o) \otimes u_1])$, $C_k^o = C_{k-1} S_k$, $u_1 = (1\ 1)$, $\otimes$ is the Kronecker product, $\mathrm{sgn}(X)$ is the matrix which gives the sign values of the elements of X, the sign value being respectively equal to −1,0,1 if the element is negative, of null value or positive, $\mathrm{Min}(X)$ is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} & s_{k,3} & s_{k,4} \\ s_{k,1}\Omega & s_{k,2}\Omega & s_{k,3}\Omega & s_{k,4}\Omega \\ s_{k,2}\Omega & s_{k,1} & s_{k,4}\Omega & s_{k,3} \\ s_{k,2} & s_{k,1}\Omega & s_{k,4} & s_{k,3}\Omega \\ s_{k,3}\Omega & s_{k,4} & s_{k,1} & s_{k,2}\Omega \\ s_{k,3} & s_{k,4}\Omega & s_{k,1}\Omega & s_{k,2} \\ s_{k,4}\Omega & s_{k,3}\Omega & s_{k,2} & s_{k,1} \\ s_{k,4} & s_{k,3} & s_{k,2}\Omega & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions;

four modulators for position modulating a pulse UWB signal, where each modulator is associated with a radiative element and modulates said signal position, during a use of the transmission channel, by using components of the vector associated with said radiative element and with said use of the channel;

where each radiative element is adapted to transmit the signal thus modulated by the said associated modulator.

The invention also relates to a UWB transmitter system with eight radiative elements, for implementing the process according to the third embodiment. This transmitter system includes:

coding means for coding a block $\sigma_k = (s_{k,1}, s_{k,2}, s_{k,3}, s_{k,4}, s_{k,5}, s_{k,6}, s_{k,7}, s_{k,8})$ of eight information symbols which belong to a 2-PPM modulation alphabet, in a sequence of eight vectors with two components, with the components of a vector being intended to position modulate a pulse UWB signal for a given radiative element of the said system and a given transmission channel use, with each component corresponding to one PPM modulation position, with coding means obtaining the said vectors from elements of the code matrix:

$$C_k = \begin{pmatrix} c_{k,1} & c_{k,2} & c_{k,3} & c_{k,4} & c_{k,5} & c_{k,6} & c_{k,7} & c_{k,8} \\ c_{k,2}\Omega & c_{k,1} & c_{k,4} & c_{k,3}\Omega & c_{k,6} & c_{k,5}\Omega & c_{k,8}\Omega & c_{k,7} \\ c_{k,3}\Omega & c_{k,4}\Omega & c_{k,1} & c_{k,2} & c_{k,7} & c_{k,8} & c_{k,5}\Omega & c_{k,6}\Omega \\ c_{k,4}\Omega & c_{k,3} & c_{k,2}\Omega & c_{k,1} & c_{k,8} & c_{k,7}\Omega & c_{k,6} & c_{k,5}\Omega \\ c_{k,5}\Omega & c_{k,6}\Omega & c_{k,7}\Omega & c_{k,8}\Omega & c_{k,1} & c_{k,2} & c_{k,3} & c_{k,4} \\ c_{k,6}\Omega & c_{k,5}\Omega & c_{k,8}\Omega & c_{k,7} & c_{k,2}\Omega & c_{k,1} & c_{k,4}\Omega & c_{k,3} \\ c_{k,7}\Omega & c_{k,8} & c_{k,5} & c_{k,6}\Omega & c_{k,3}\Omega & c_{k,4} & c_{k,1} & c_{k,2}\Omega \\ c_{k,8}\Omega & c_{k,7}\Omega & c_{k,6} & c_{k,5} & c_{k,4}\Omega & c_{k,3}\Omega & c_{k,2} & c_{k,1} \end{pmatrix}$$

where $C_k = \mathrm{sgn}(C_k^o - [\mathrm{Min}(C_k^o) \otimes u_1])$, $C_k^o = C_{k-1} S_k$, $u_1 = (1\ 1)$, $\otimes$ is the Kronecker product, $\mathrm{sgn}(X)$ is the matrix which gives the sign values of the elements of X, the sign value being respectively equal to −1,0,1 if the element is negative, of null value or positive, $\mathrm{Min}(X)$ is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} & s_{k,3} & s_{k,4} & s_{k,5} & s_{k,6} & s_{k,7} & s_{k,8} \\ s_{k,1}\Omega & s_{k,2}\Omega & s_{k,3}\Omega & s_{k,4}\Omega & s_{k,5}\Omega & s_{k,6}\Omega & s_{k,7}\Omega & s_{k,8}\Omega \\ s_{k,2}\Omega & s_{k,1} & s_{k,4} & s_{k,3}\Omega & s_{k,6} & s_{k,5}\Omega & s_{k,8}\Omega & s_{k,7} \\ s_{k,2} & s_{k,1}\Omega & s_{k,4}\Omega & s_{k,3} & s_{k,6}\Omega & s_{k,5} & s_{k,8} & s_{k,7}\Omega \\ s_{k,3}\Omega & s_{k,4}\Omega & s_{k,1} & s_{k,2} & s_{k,7} & s_{k,8} & s_{k,5}\Omega & s_{k,6}\Omega \\ s_{k,3} & s_{k,4} & s_{k,1}\Omega & s_{k,2}\Omega & s_{k,7}\Omega & s_{k,8}\Omega & s_{k,5} & s_{k,6} \\ s_{k,4}\Omega & s_{k,3} & s_{k,2}\Omega & s_{k,1} & s_{k,8} & s_{k,7}\Omega & s_{k,6} & s_{k,5}\Omega \\ s_{k,4} & s_{k,3}\Omega & s_{k,2} & s_{k,1}\Omega & s_{k,8}\Omega & s_{k,7} & s_{k,6}\Omega & s_{k,5} \\ s_{k,5}\Omega & s_{k,6}\Omega & s_{k,7}\Omega & s_{k,8}\Omega & s_{k,1} & s_{k,2} & s_{k,3} & s_{k,4} \\ s_{k,5} & s_{k,6} & s_{k,7} & s_{k,8} & s_{k,1}\Omega & s_{k,2}\Omega & s_{k,3}\Omega & s_{k,4}\Omega \\ s_{k,6}\Omega & s_{k,5} & s_{k,8}\Omega & s_{k,7} & s_{k,2}\Omega & s_{k,1} & s_{k,4}\Omega & s_{k,3} \\ s_{k,6} & s_{k,5}\Omega & s_{k,8} & s_{k,7}\Omega & s_{k,2} & s_{k,1}\Omega & s_{k,4} & s_{k,3}\Omega \\ s_{k,7}\Omega & s_{k,8} & s_{k,5} & s_{k,6}\Omega & s_{k,3}\Omega & s_{k,4} & s_{k,1} & s_{k,2}\Omega \\ s_{k,7} & s_{k,8}\Omega & s_{k,5}\Omega & s_{k,6} & s_{k,3} & s_{k,4}\Omega & s_{k,1}\Omega & s_{k,2} \\ s_{k,8}\Omega & s_{k,7}\Omega & s_{k,6} & s_{k,5} & s_{k,4}\Omega & s_{k,3}\Omega & s_{k,2} & s_{k,1} \\ s_{k,8} & s_{k,7} & s_{k,6}\Omega & s_{k,5}\Omega & s_{k,4} & s_{k,3} & s_{k,2}\Omega & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions;

If $P = 2$:
$$Y_k = \begin{pmatrix} Y_{k,1} & Y_{k,2} \\ Y_{k,2}\Omega_Q & Y_{k,1} \end{pmatrix}$$

If $P = 4$:
$$Y_k = \begin{pmatrix} Y_{k,1} & Y_{k,2} & Y_{k,3} & Y_{k,4} \\ Y_{k,2}\Omega_Q & Y_{k,1} & Y_{k,4}\Omega_Q & Y_{k,2} \\ Y_{k,3}\Omega_Q & Y_{k,4} & Y_{k,1} & Y_{k,2}\Omega_Q \\ Y_{k,4}\Omega_Q & Y_{k,3}\Omega_Q & Y_{k,2} & Y_{k,1} \end{pmatrix}$$

If $P = 8$:
$$Y_k = \begin{pmatrix} Y_{k,1} & Y_{k,2} & Y_{k,3} & Y_{k,4} & Y_{k,5} & Y_{k,6} & Y_{k,7} & Y_{k,8} \\ Y_{k,2}\Omega_Q & Y_{k,1} & Y_{k,4} & Y_{k,3}\Omega_Q & Y_{k,6} & Y_{k,5}\Omega_Q & Y_{k,8}\Omega_Q & Y_{k,7} \\ Y_{k,3}\Omega_Q & Y_{k,4}\Omega_Q & Y_{k,1} & Y_{k,2} & Y_{k,7} & Y_{k,8} & Y_{k,5}\Omega_Q & Y_{k,6}\Omega_Q \\ Y_{k,4}\Omega_Q & Y_{k,3} & Y_{k,2}\Omega_Q & Y_{k,1} & Y_{k,8} & Y_{k,7}\Omega_Q & Y_{k,6} & Y_{k,5}\Omega_Q \\ Y_{k,5}\Omega_Q & Y_{k,6}\Omega_Q & Y_{k,7}\Omega_Q & Y_{k,8}\Omega_Q & Y_{k,1} & Y_{k,2} & Y_{k,3} & Y_{k,4} \\ Y_{k,6}\Omega_Q & Y_{k,5} & Y_{k,8}\Omega_Q & Y_{k,7} & Y_{k,2}\Omega_Q & Y_{k,1} & Y_{k,4}\Omega_Q & Y_{k,3} \\ Y_{k,7}\Omega_Q & Y_{k,8} & Y_{k,5} & Y_{k,6} & Y_{k,3}\Omega_Q & Y_{k,4} & Y_{k,1} & Y_{k,2}\Omega_Q \\ Y_{k,8}\Omega_Q & Y_{k,7}\Omega_Q & Y_{k,6}\Omega_Q & Y_{k,5} & Y_{k,4}\Omega_Q & Y_{k,3}\Omega_Q & Y_{k,2} & Y_{k,1} \end{pmatrix}$$

eight modulators for position modulating a pulse UWB signal, where each modulator is associated with a radiative element and modulates the said signal position, during a use of the transmission channel, by using the components of the vector associated with the said radiative element and with said use of the channel;

where each radiative element is adapted to transmit the signal thus modulated by said associated modulator.

According to a first variant, the radiative elements of the transmitter system are UWB antennas. According to a second variant, the radiative elements of the transmitter system are laser diodes or electroluminescent diodes.

The said pulse signal may be a TH-UWB signal, a DS-UWB signal or a TH-DS-UWB signal.

Finally the invention relates to a UWB receiver system made up of a plurality (Q') of sensors intended to receive a pulse UWB signal transmitted by a transmitter system such as defined above, in which:

each sensor is connected to a Rake filter comprising a plurality (L) of fingers, with each finger corresponding to a multi-path of the propagation channel associated with this sensor, where each finger $q=1,\ldots,Q'L$ provides a decision variable value, $y_{k,i,q,m}$, for the m-th modulation position during the i-th symbol time of the k-th block time;

a calculation module which receives the said decision variable values and which calculates:

for each block time k and each symbol time $i=1,\ldots,P$, the row vector $Y_{k,i}$ defined by $$Y_{k,i} = \sum_{q=1}^{Q} (y_{k,i,q,1}\, y_{k,i,q,2}) \otimes e_q$$

where $e_q$ is the q-th row vector of the identity matrix $I_Q$, of size $Q \times Q$;

for each block time k, the matrix $Y_k$ of size $P \times 2QP$, where P is the number of antennas of the transmitter system, defined by:

where $\Omega_Q$ is a matrix given by $\Omega_Q = \Omega \otimes I_Q$ where $I_Q$ is the identity matrix of size $Q \times Q$ and $\Omega$ is the permutation matrix of the two PPM modulation positions, a detection module which estimates the P information symbols transmitted during the block time by:

$$(\hat{s}_{k,1}, \hat{s}_{k,2}, \ldots, \hat{s}_{k,P}) = \underset{s_{k,1}, s_{k,2}, \ldots, s_{k,P}}{\mathrm{argmax}} \{\mathrm{trace}(Y_{k,i}(S_k \otimes I_Q) Y_k^T)\}$$

where ⊗ is the Kronecker product and if $P = 2$, $S_k$ is given by:

$$S_k = \begin{pmatrix} s_{k,1} & s_{k,2} \\ s_{k,1}\Omega & s_{k,2}\Omega \\ s_{k,2}\Omega & s_{k,1} \\ s_{k,2} & s_{k,1}\Omega \end{pmatrix}$$

if $P = 4$, $S_k$ is given by:

$$S_k = \begin{pmatrix} s_{k,1} & s_{k,2} & s_{k,3} & s_{k,4} \\ s_{k,1}\Omega & s_{k,2}\Omega & s_{k,3}\Omega & s_{k,4}\Omega \\ s_{k,2}\Omega & s_{k,1} & s_{k,4}\Omega & s_{k,3} \\ s_{k,2} & s_{k,1}\Omega & s_{k,4} & s_{k,3}\Omega \\ s_{k,3}\Omega & s_{k,4} & s_{k,1} & s_{k,2}\Omega \\ s_{k,3} & s_{k,4}\Omega & s_{k,1}\Omega & s_{k,2} \\ s_{k,4}\Omega & s_{k,3}\Omega & s_{k,2} & s_{k,1} \\ s_{k,4} & s_{k,3} & s_{k,2}\Omega & s_{k,1}\Omega \end{pmatrix}$$

if $P = 8$ :, $S_k$ is given by:

$$S_k = \begin{pmatrix} s_{k,1} & s_{k,2} & s_{k,3} & s_{k,4} & s_{k,5} & s_{k,6} & s_{k,7} & s_{k,8} \\ s_{k,1}\Omega & s_{k,2}\Omega & s_{k,3}\Omega & s_{k,4}\Omega & s_{k,5}\Omega & s_{k,6}\Omega & s_{k,7}\Omega & s_{k,8}\Omega \\ s_{k,2}\Omega & s_{k,1} & s_{k,4} & s_{k,3}\Omega & s_{k,6} & s_{k,5}\Omega & s_{k,8}\Omega & s_{k,7} \\ s_{k,2} & s_{k,1}\Omega & s_{k,4}\Omega & s_{k,3} & s_{k,6}\Omega & s_{k,5} & s_{k,8} & s_{k,7}\Omega \\ s_{k,3}\Omega & s_{k,4}\Omega & s_{k,1} & s_{k,2} & s_{k,7} & s_{k,8} & s_{k,5}\Omega & s_{k,6}\Omega \\ s_{k,3} & s_{k,4} & s_{k,1}\Omega & s_{k,2}\Omega & s_{k,7}\Omega & s_{k,8}\Omega & s_{k,5} & s_{k,6} \\ s_{k,4}\Omega & s_{k,3} & s_{k,2}\Omega & s_{k,1} & s_{k,8} & s_{k,7}\Omega & s_{k,6} & s_{k,5}\Omega \\ s_{k,4} & s_{k,3}\Omega & s_{k,2} & s_{k,1}\Omega & s_{k,8}\Omega & s_{k,7} & s_{k,6}\Omega & s_{k,5} \\ s_{k,5}\Omega & s_{k,6}\Omega & s_{k,7}\Omega & s_{k,8}\Omega & s_{k,1} & s_{k,2} & s_{k,3} & s_{k,4} \\ s_{k,5} & s_{k,6} & s_{k,7} & s_{k,8} & s_{k,1}\Omega & s_{k,2}\Omega & s_{k,3}\Omega & s_{k,4}\Omega \\ s_{k,6}\Omega & s_{k,5} & s_{k,8}\Omega & s_{k,7} & s_{k,2}\Omega & s_{k,1} & s_{k,4}\Omega & s_{k,3} \\ s_{k,6} & s_{k,5}\Omega & s_{k,8} & s_{k,7}\Omega & s_{k,2} & s_{k,1}\Omega & s_{k,4} & s_{k,3}\Omega \\ s_{k,7}\Omega & s_{k,8} & s_{k,5} & s_{k,6}\Omega & s_{k,3}\Omega & s_{k,4} & s_{k,1} & s_{k,2}\Omega \\ s_{k,7} & s_{k,8}\Omega & s_{k,5}\Omega & s_{k,6} & s_{k,3} & s_{k,4}\Omega & s_{k,1}\Omega & s_{k,2} \\ s_{k,8}\Omega & s_{k,7}\Omega & s_{k,6} & s_{k,5} & s_{k,4}\Omega & s_{k,3}\Omega & s_{k,2} & s_{k,1} \\ s_{k,8} & s_{k,7} & s_{k,6}\Omega & s_{k,5}\Omega & s_{k,4} & s_{k,3} & s_{k,2}\Omega & s_{k,1}\Omega \end{pmatrix}$$

where $s_{k,1}, s_{k,2}, \ldots, s_{k,P}$ are the possible 2-PPM information symbols.

According to a first variant, the sensors are UWB antennas. According to a second variant, the sensors are photo-detectors.

BRIEF DESCRIPTION OF THE DIAGRAMS

Other characteristics and advantages of the invention will become apparent on reading one of the preferred embodiments whilst referring to the attached figures, which include:

Figure 1:
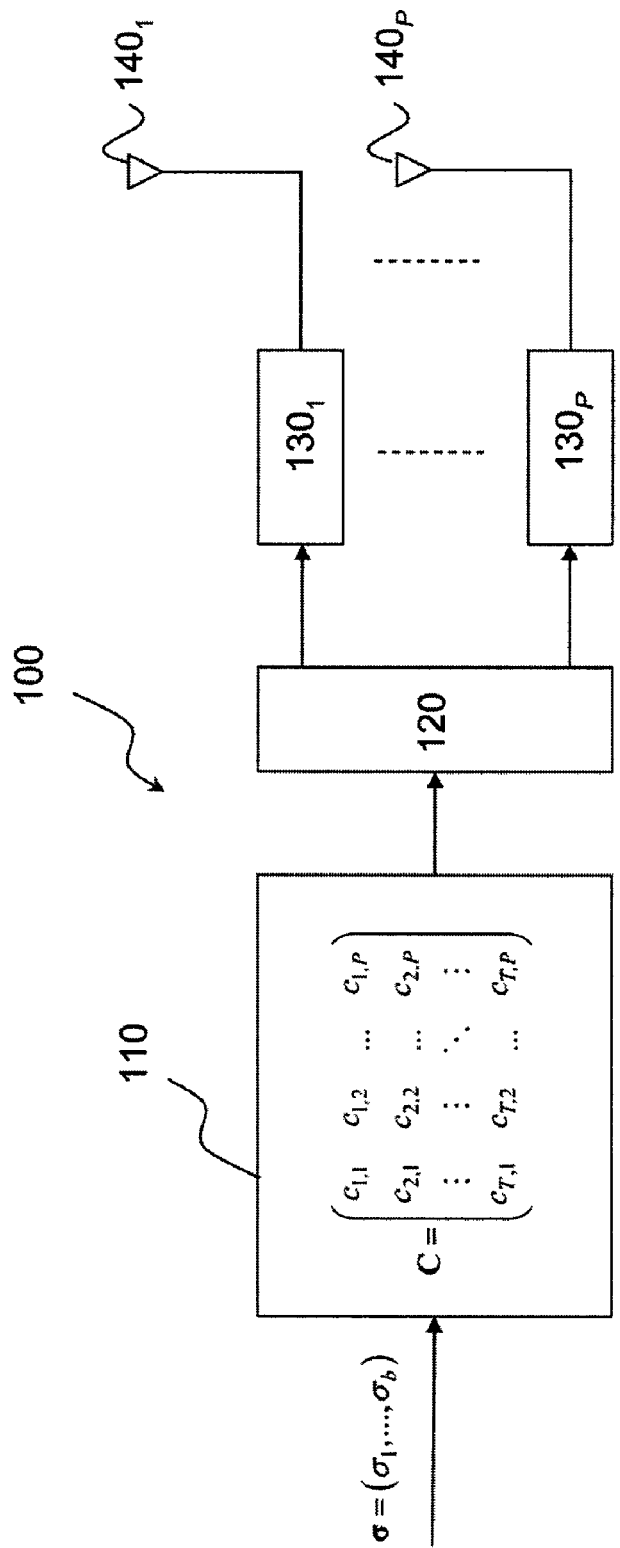
FIG. 1 is a schematic representation of a MIMO transmitter system using an STBC code which is known from the state of the art.
Figure 2:
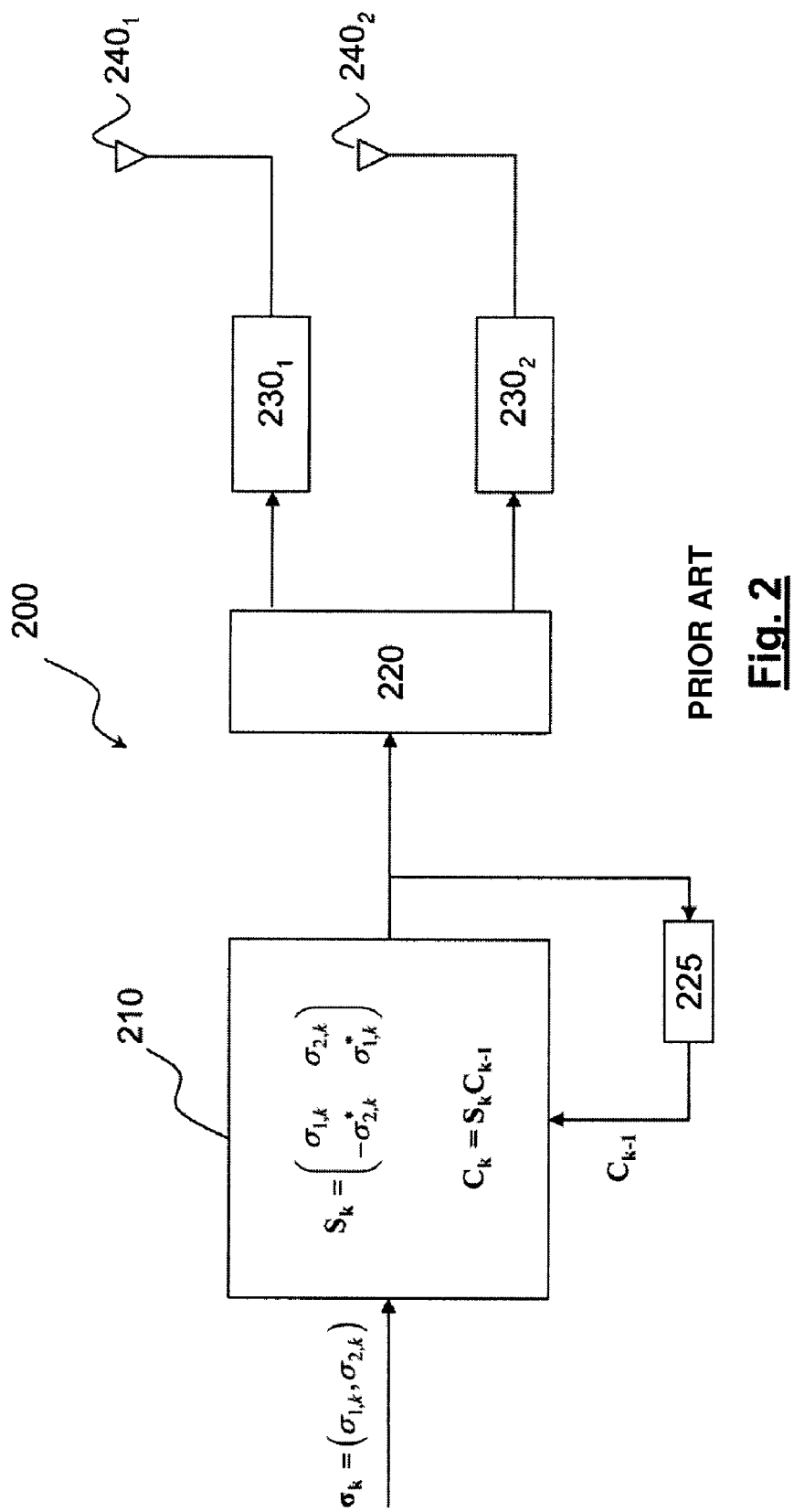
FIG. 2 is a schematic representation of a MIMO transmitter system using a differential space-time code which is known from the state of the art.
Figure 3A:
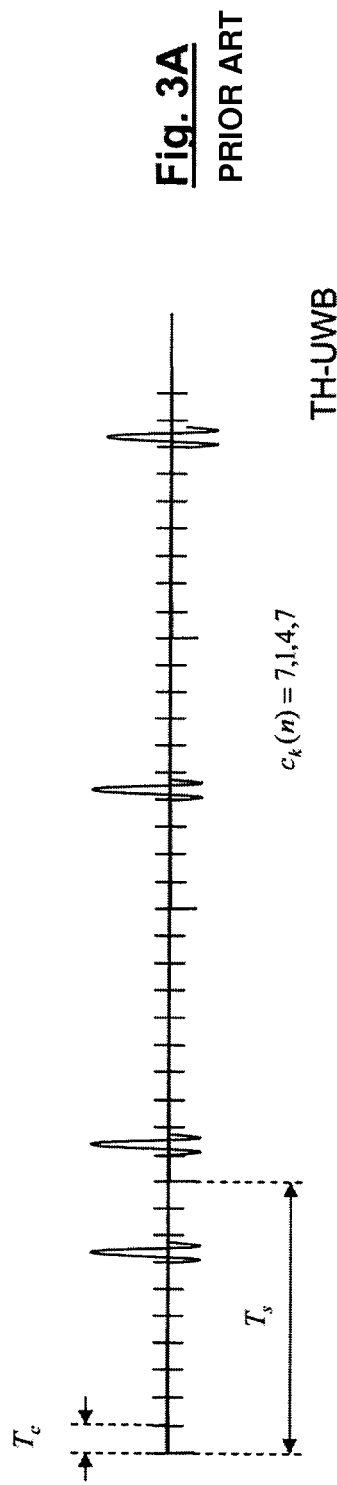
Figure 3B:
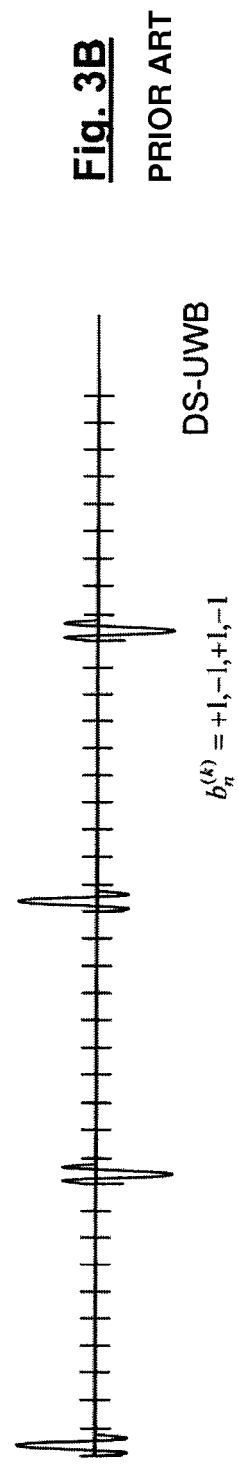
Figure 3C:
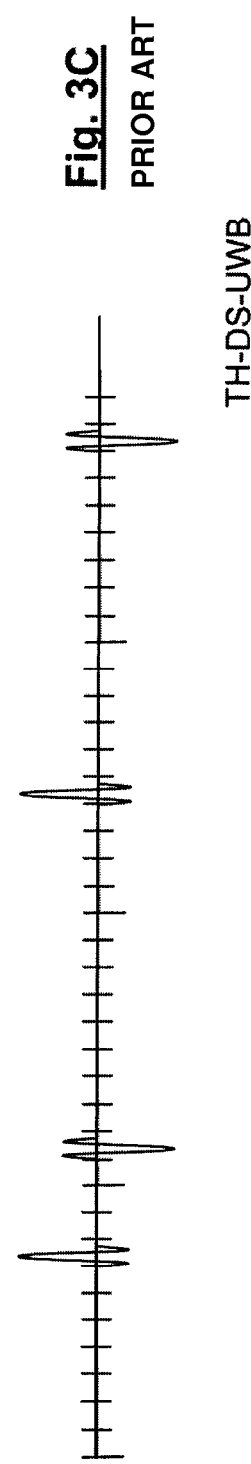
Figure 4:
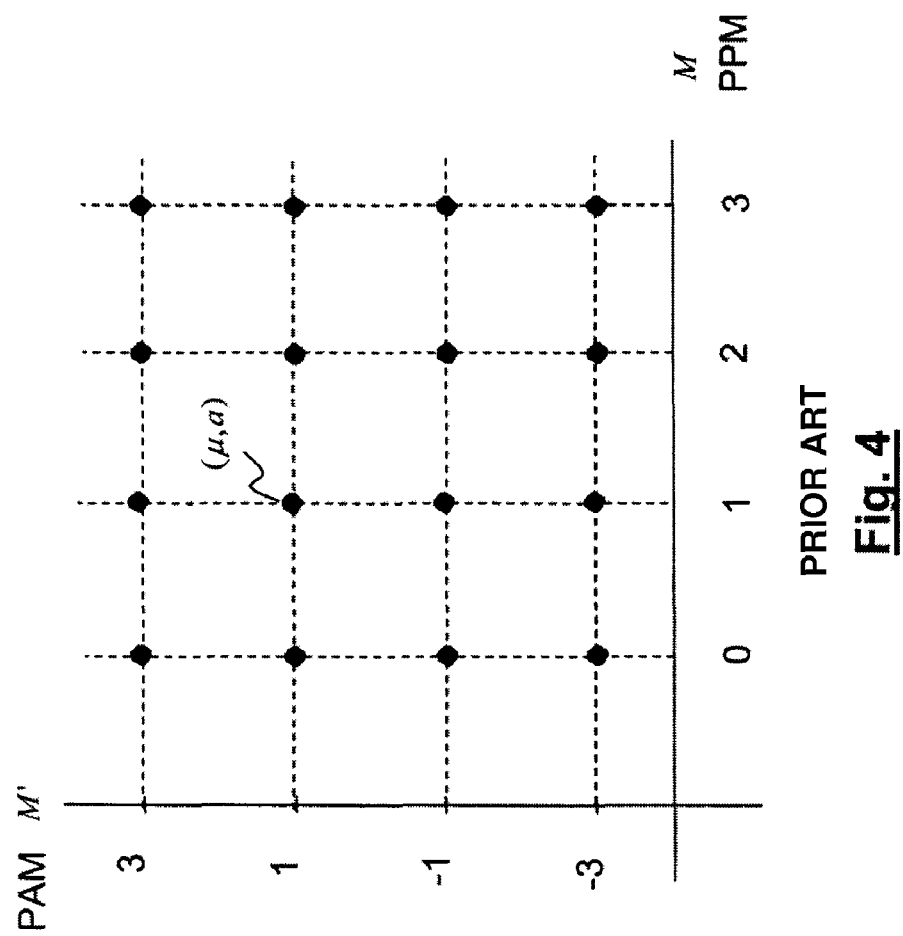
Figure 5:
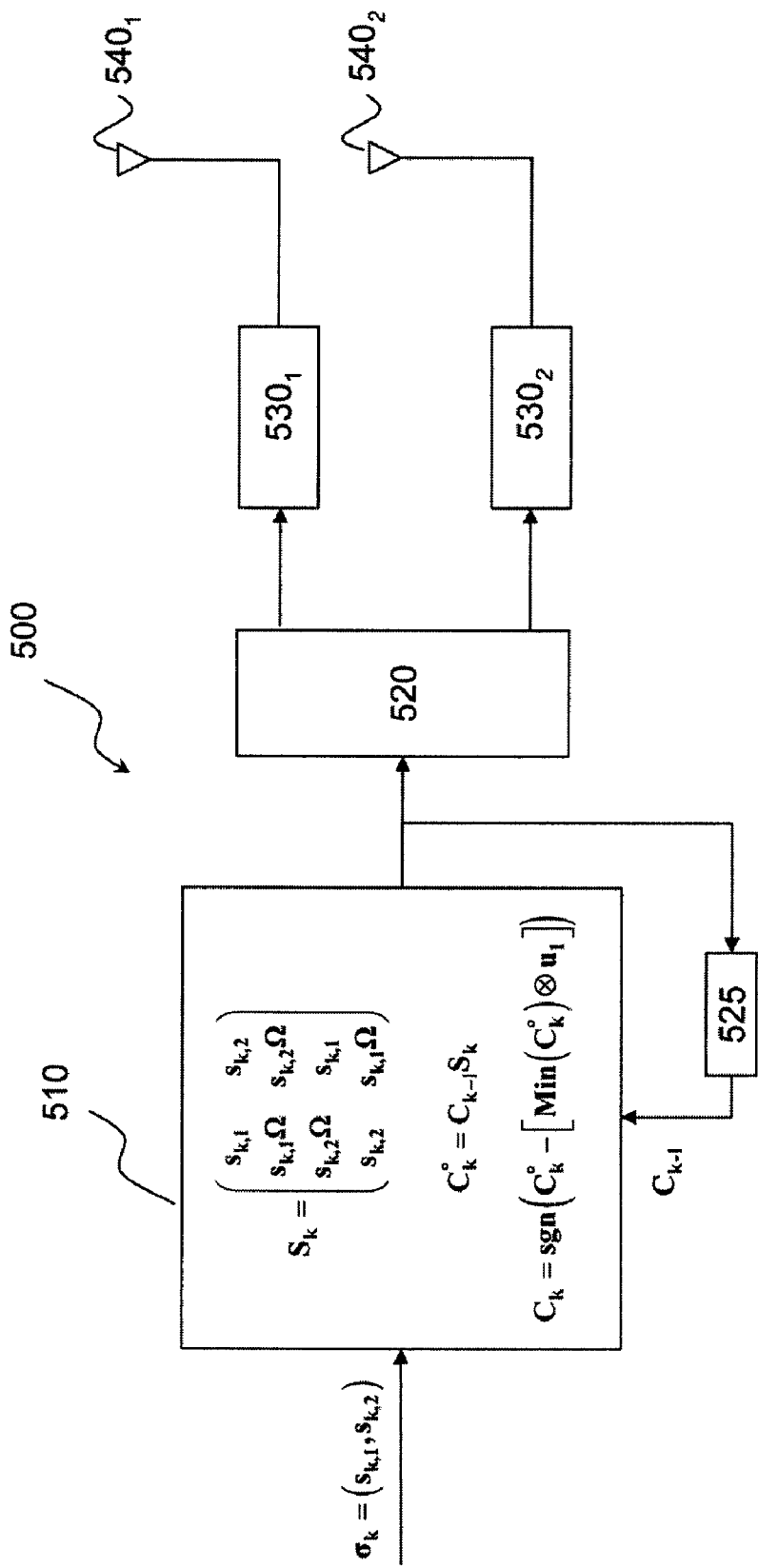
Figure 6:
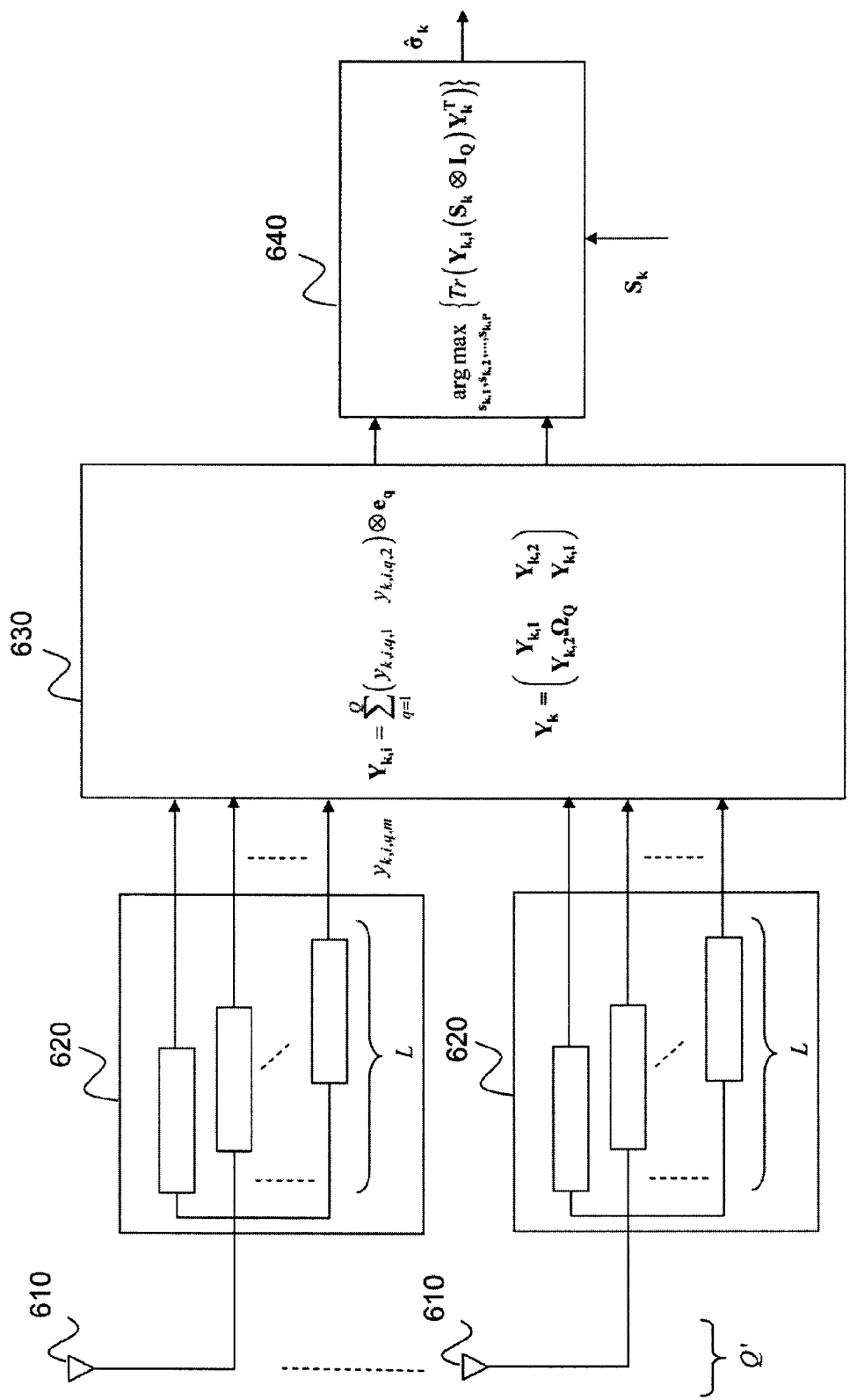
Figure 7A:
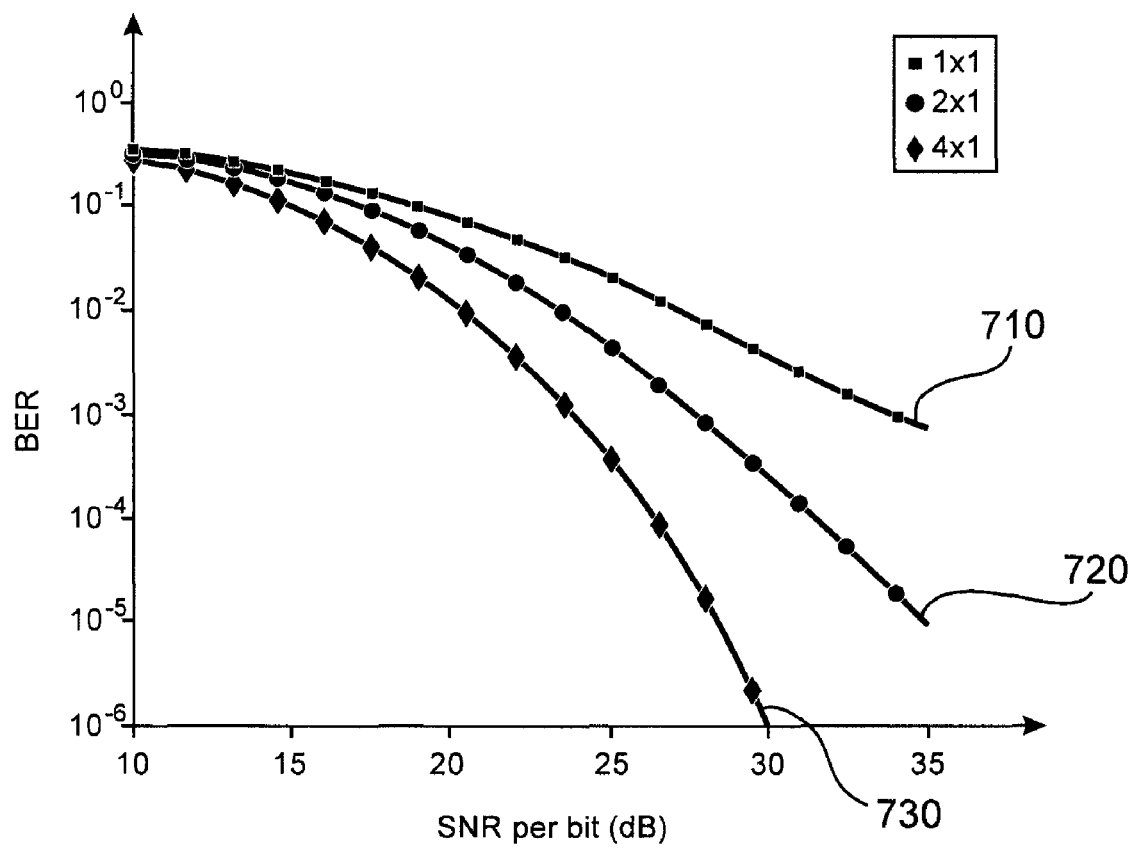
Figure 7B:
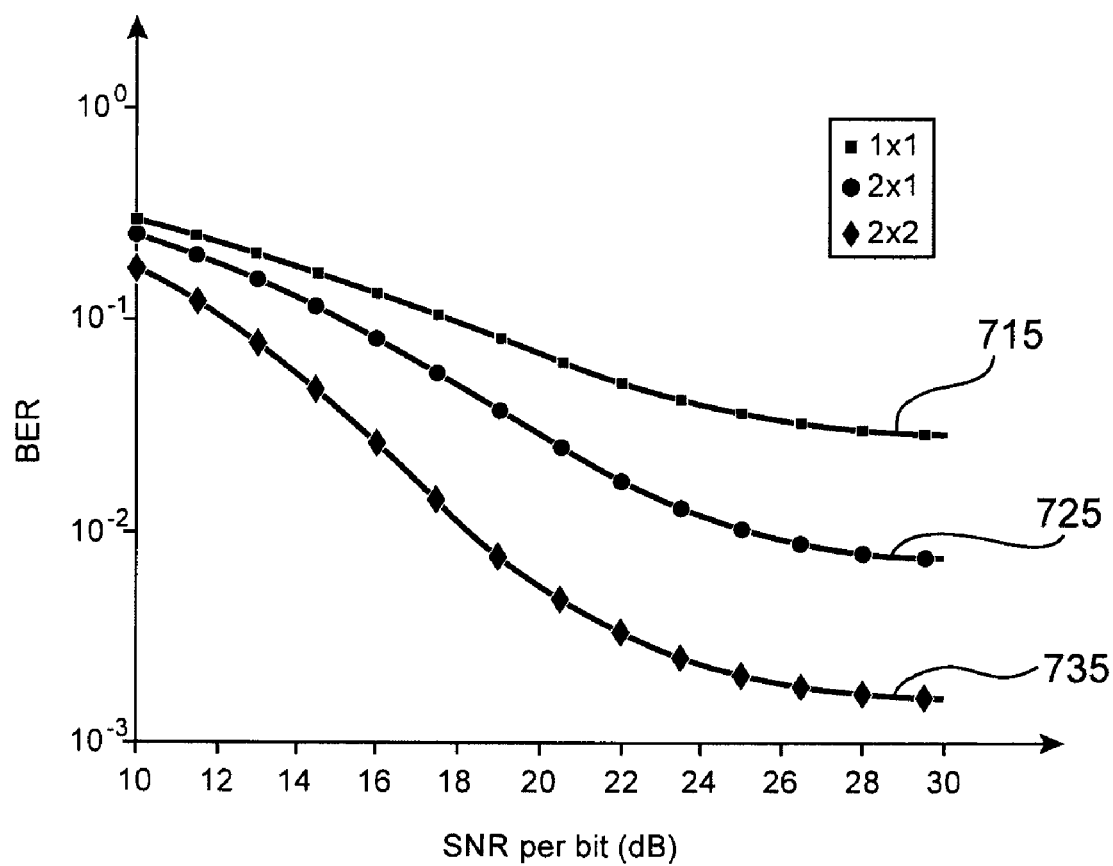

FIGS. 3A to 3C respectively represent the TH-UWB, DS-UWB and TH-DS-UWB signal forms;

FIG. 4 represents a M-PPM-M'-PPM modulation alphabet;

FIG. 5 is a schematic representation of a multi-antenna UWB transmitter system according to one embodiment for the invention;

FIG. 6 is a schematic representation of a receiver system according to one embodiment for the invention;

FIGS. 7A and 7B show the binary error rate curves as a function of the signal to noise ratio of a pulse UWB MIMO system according to the invention, in the absence and presence respectively of interference between pulses.

DETAILED DESCRIPTION OF SPECIFIC EMBODIMENTS

The basic idea underlying the invention is to design a differential space-time code whose coding diversity is obtained through a permutation operator acting on the modulation positions of information symbols belonging to a 2-PPM alphabet, also known as binary PPM.

In what follows a pulse UWB transmitter system using P transmitter antennas will be considered, and more generally, using P radiative elements. The space-time code used by the system is defined by the following matrix of dimension P×2P, For $P = 2$:

$$C_k = \begin{pmatrix} c_{k,1} & c_{k,2} \\ c_{k,2}\Omega & c_{k,1} \end{pmatrix}; \quad (19)$$

For $P = 4$:

$$C_k = \begin{pmatrix} c_{k,1} & c_{k,2} & c_{k,3} & c_{k,4} \\ c_{k,2}\Omega & c_{k,1} & c_{k,4}\Omega & c_{k,3} \\ c_{k,3}\Omega & c_{k,4} & c_{k,1} & c_{k,2}\Omega \\ c_{k,4}\Omega & c_{k,3}\Omega & c_{k,2} & c_{k,1} \end{pmatrix}; \quad (20)$$

For $P = 8$:

$$C_k = \begin{pmatrix} c_{k,1} & c_{k,2} & c_{k,3} & c_{k,4} & c_{k,5} & c_{k,6} & c_{k,7} & c_{k,8} \\ c_{k,2}\Omega & c_{k,1} & c_{k,4} & c_{k,3}\Omega & c_{k,6} & c_{k,5}\Omega & c_{k,8}\Omega & c_{k,7} \\ c_{k,3}\Omega & c_{k,4}\Omega & c_{k,1} & c_{k,2} & c_{k,7} & c_{k,8} & c_{k,5}\Omega & c_{k,6}\Omega \\ c_{k,4}\Omega & c_{k,3} & c_{k,2}\Omega & c_{k,1} & c_{k,8} & c_{k,7}\Omega & c_{k,6} & c_{k,5}\Omega \\ c_{k,5}\Omega & c_{k,6}\Omega & c_{k,7}\Omega & c_{k,8}\Omega & c_{k,1} & c_{k,2} & c_{k,3} & c_{k,4} \\ c_{k,6}\Omega & c_{k,5} & c_{k,8}\Omega & c_{k,7} & c_{k,2}\Omega & c_{k,1} & c_{k,4}\Omega & c_{k,3} \\ c_{k,7}\Omega & c_{k,8} & c_{k,5} & c_{k,6}\Omega & c_{k,3}\Omega & c_{k,4} & c_{k,1} & c_{k,2}\Omega \\ c_{k,8}\Omega & c_{k,7}\Omega & c_{k,6} & c_{k,5} & c_{k,4}\Omega & c_{k,3}\Omega & c_{k,2} & c_{k,1} \end{pmatrix}; \quad (21)$$

where $c_{k,i}$, $i=1, \ldots, P$ are row vectors of dimension 2 and $\Omega$ is the permutation matrix:

$$\Omega = \begin{pmatrix} 0 & 1 \\ 1 & 0 \end{pmatrix} \quad (22)$$

The matrix of the differential space-time code $C_k$ is obtained through the recurrence relationship:

$$C_k = \text{sgn}(C_k^o - [\text{Min}(C_k^o) \otimes u_1]),$$

$$C_k^o = C_{k-1} S_k \quad (23)$$

where $S_k$ is a matrix of size 2P×2P which depends only on information symbols $u_1 = (1\ 1)$, ⊗ is the Kronecker product and sgn(X) is the matrix that gives for each element x the sign of x, defined as sgn(x)=1 if x>0, sgn(x)=−1 if x<0 and sgn(0)=0, and Min(X) is a matrix whose elements give the lower values of two consecutive elements of a row of the matrix X, namely if X is a matrix of size P×2P Min(X) is defined by the matrix of size P×P whose elements are:

$$\min(x_{i,j,1}, x_{i,j,2}), i=1, \ldots, P, j=1, \ldots, P \quad (24)$$

X being regarded as bloc matrix composed of $P^2$ matrices $x_{i,j} = (x_{i,j,1}\ x_{i,j,2})$ of size 1×2.

For example if the matrix $$X = \begin{pmatrix} 0 & 1 & -1 & 7 \\ 4 & 1 & 2 & 3 \end{pmatrix},$$

$x_{1,1}=(0\ 1);\ x_{1,2}=(-1\ 7);\ x_{2,1}=(4\ 1);\ x_{2,2}=(2\ 3)$ and $$\text{Min}(X) = \begin{pmatrix} 0 & -1 \\ 1 & 2 \end{pmatrix},$$

hence $$\text{Min}(X) \otimes u_1 = \begin{pmatrix} 0 & 0 & -1 & -1 \\ 1 & 1 & 2 & 2 \end{pmatrix}$$

and $$\text{sgn}(X - \text{Min}(X) \otimes u_1) = \begin{pmatrix} 0 & 1 & 0 & 1 \\ 1 & 0 & 0 & 1 \end{pmatrix}.$$

The matrix $S_k$ is a function of the block of information symbols $\sigma_k = (s_{k,1}, s_{k,2}, \ldots, s_{k,P})$ where $s_{k,p} = (s_{k,p,1}\ s_{k,p,2})$ is a symbol 2-PPM equal to (1 0) where it corresponds to the first modulation positions and to (0 1) when it corresponds to the second modulation position.

For P=2, the block $\sigma_k$ is made up of 2-PPM symbols and $S_k$ is a matrix of size 4×4 given by:

$$S_k = \begin{pmatrix} s_{k,1} & s_{k,2} \\ s_{k,1}\Omega & s_{k,2}\Omega \\ s_{k,2}\Omega & s_{k,1} \\ s_{k,2} & s_{k,1}\Omega \end{pmatrix} \quad (25)$$

For P=4, the block $\sigma_k$ is made up of 4 2-PPM symbols and $S_k$ is a matrix of size 8×8 given by:

$$S_k = \begin{pmatrix} s_{k,1} & s_{k,2} & s_{k,3} & s_{k,4} \\ s_{k,1}\Omega & s_{k,2}\Omega & s_{k,3}\Omega & s_{k,4}\Omega \\ s_{k,2}\Omega & s_{k,1} & s_{k,4}\Omega & s_{k,3} \\ s_{k,2} & s_{k,1}\Omega & s_{k,4} & s_{k,3}\Omega \\ s_{k,3}\Omega & s_{k,4} & s_{k,1} & s_{k,2}\Omega \\ s_{k,3} & s_{k,4}\Omega & s_{k,1}\Omega & s_{k,2} \\ s_{k,4}\Omega & s_{k,3}\Omega & s_{k,2} & s_{k,1} \\ s_{k,4} & s_{k,3} & s_{k,2}\Omega & s_{k,1}\Omega \end{pmatrix} \quad (26)$$

For P=8, the block $a_k$ is made up of 8 2-PPM symbols and $S_k$ is a matrix of size 16×16 given by:

$$S_k = \begin{pmatrix} s_{k,1} & s_{k,2} & s_{k,3} & s_{k,4} & s_{k,5} & s_{k,6} & s_{k,7} & s_{k,8} \\ s_{k,1}\Omega & s_{k,2}\Omega & s_{k,3}\Omega & s_{k,4}\Omega & s_{k,5}\Omega & s_{k,6}\Omega & s_{k,7}\Omega & s_{k,8}\Omega \\ s_{k,2}\Omega & s_{k,1} & s_{k,4} & s_{k,3}\Omega & s_{k,6} & s_{k,5}\Omega & s_{k,8}\Omega & s_{k,7} \\ s_{k,2} & s_{k,1}\Omega & s_{k,4}\Omega & s_{k,3} & s_{k,6}\Omega & s_{k,5} & s_{k,8} & s_{k,7}\Omega \\ s_{k,3}\Omega & s_{k,4}\Omega & s_{k,1} & s_{k,2} & s_{k,7} & s_{k,8} & s_{k,5}\Omega & s_{k,6}\Omega \\ s_{k,3} & s_{k,4} & s_{k,1}\Omega & s_{k,2}\Omega & s_{k,7}\Omega & s_{k,8}\Omega & s_{k,5} & s_{k,6} \\ s_{k,4}\Omega & s_{k,3} & s_{k,2}\Omega & s_{k,1} & s_{k,8} & s_{k,7}\Omega & s_{k,6} & s_{k,5}\Omega \\ s_{k,4} & s_{k,3}\Omega & s_{k,2} & s_{k,1}\Omega & s_{k,8}\Omega & s_{k,7} & s_{k,6}\Omega & s_{k,5} \\ s_{k,5}\Omega & s_{k,6}\Omega & s_{k,7}\Omega & s_{k,8}\Omega & s_{k,1} & s_{k,2} & s_{k,3} & s_{k,4} \\ s_{k,5} & s_{k,6} & s_{k,7} & s_{k,8} & s_{k,1}\Omega & s_{k,2}\Omega & s_{k,3}\Omega & s_{k,4}\Omega \\ s_{k,6}\Omega & s_{k,5} & s_{k,8}\Omega & s_{k,7} & s_{k,2}\Omega & s_{k,1} & s_{k,4}\Omega & s_{k,3} \\ s_{k,6} & s_{k,5}\Omega & s_{k,8} & s_{k,7}\Omega & s_{k,2} & s_{k,1}\Omega & s_{k,4} & s_{k,3}\Omega \\ s_{k,7}\Omega & s_{k,8} & s_{k,5} & s_{k,6}\Omega & s_{k,3}\Omega & s_{k,4} & s_{k,1} & s_{k,2}\Omega \\ s_{k,7} & s_{k,8}\Omega & s_{k,5}\Omega & s_{k,6} & s_{k,3} & s_{k,4}\Omega & s_{k,1}\Omega & s_{k,2} \\ s_{k,8}\Omega & s_{k,7}\Omega & s_{k,6} & s_{k,5} & s_{k,4}\Omega & s_{k,3}\Omega & s_{k,2} & s_{k,1} \\ s_{k,8} & s_{k,7} & s_{k,6}\Omega & s_{k,5}\Omega & s_{k,4} & s_{k,3} & s_{k,2}\Omega & s_{k,1}\Omega \end{pmatrix} \quad (27)$$

The matrix $C_0$, which initialises the recurrence relationship (23) may be given by the expression (19), (20) or (21) by selecting values of 2-PPM symbols for $c_{k,1}, \ldots c_{k,P}$, for example $c_{k,1} = c_{k,2} = \ldots = c_{k,P} = (1\ 0)$. It will be apparent, however, to the man skilled in the art, that other values of $c_{k,1}, \ldots c_{k,P}$ may equally be envisaged.

It can be shown that if the matrix $C_k$ is of the form (19), (20) or (21) and $S_k$ is, respectively, of the form (25), (26) or (27), then the matrix $C_{k+1}$ obtained by the recurrence relationship (21) is again of the form (19), (20) or (21). Furthermore, given that the elements of the matrix $C_k^o$ are greater than or equal to the elements of matrix $\text{Min}(C_k^o) \otimes u_1$, the matrix $C_k$ given by (23) of made up of 0 and of 1. In other words, the differential space-time code $C_k$ does not introduce an inversion of the polarity of the modulated signal pulses, nor an amplification of the latter.

The space-time code $C_k$ has a unit rate since P information symbols are transmitted during P uses of the channel. It can also be demonstrated that it is at maximum diversity.

In general terms, any permutation on the rows (here the term row refers to a row of vectors 1×2) and/or columns of $C_k$ in the expressions (19), (20), (21) is a space-time code according to the invention, with a permutation on the rows being equivalent to a permutation of the instants of use of the channel (PCUs) with a permutation on the columns being equivalent to a permutation of the transmission antennas.

By way of an illustration, the matrix $C_k$ may be developed for example, for P=2:

$$C_k = \begin{pmatrix} c_{k,1} & c_{k,2} \\ c_{k,2}\Omega & c_{k,1} \end{pmatrix} = \begin{pmatrix} c_{k,1,1} & c_{k,1,2} & c_{k,2,1} & c_{k,2,2} \\ c_{k,2,2} & c_{k,2,1} & c_{k,1,1} & c_{k,1,2} \end{pmatrix} \quad (28)$$

$c_{k,1,1}$ et $c_{k,1,2}$ $c_{k,1,1}$ and $c_{k,1,2}$ correspond respectively to the amplitudes of pulses in the first and second modulation positions for the first symbol time (or first PCU) of the $k^{th}$ block time and for the first antenna. $c_{k,2,1}$ and $c_{k,2,2}$ correspond respectively to the amplitudes of pulses in first and second modulation positions for the first symbol times of the $k^{th}$ block time and for the second antenna. During the second symbol time (or second PCU) of the $k^{th}$ block time, the first antenna successively transmits pulses of respective amplitudes $c_{k,2,2}$ and $c_{k,2,1}$ for the first and second modulation positions whilst during this time the second antenna successively transmits pulses of amplitude $c_{k,1,1}$ and $c_{k,1,2}$ respectively for the same modulation positions.

It will be assumed here that the system uses a TH-UWB signal, as defined in (7). The differential space-time code modulates this signal and the modulated signal is transmitted during two consecutive uses of the channel (PCUs). That is, a block of 2-PPM symbols $\sigma_k=(s_{k,1},s_{k,2})$. During the first use of the channel, the first antenna transmits a first frame, that is, using the notation of (8):

$$s_k^1(t) = \sum_{n=0}^{N_s-1} c_{k,1,1} w(t-nT_s - c(n)T_c) + c_{k,1,2} w(t-nT_s - c(n)T_c - \varepsilon) \quad (29)$$

where 0 and $\varepsilon$ correspond to the two modulation positions, and the second antenna simultaneously transmits a first frame:

$$s_k^2(t) = \sum_{n=0}^{N_s-1} c_{k,2,1} w(t-nT_s - c(n)T_c) + c_{k,2,2} w(t-nT_s - c(n)T_c - \varepsilon) \quad (30)$$

During the second use of the channel, the first antenna transmits a second frame:

$$s_k^1(t) = \sum_{n=0}^{N_s-1} c_{k,2,2} w(t-nT_s - c(n)T_c) + c_{k,2,1} w(t-nT_s - c(n)T_c - \varepsilon) \quad (31)$$

and the second simultaneously transmits a second frame:

$$s_k^2(t) = \sum_{n=0}^{N_s-1} c_{k,1,1} w(t-nT_s - c(n)T_c) + c_{k,1,2} w(t-nT_s - c(n)T_c - \varepsilon) \quad (32)$$

As seen above $c_{k,1,1}$, $c_{k,1,2}$, $c_{k,2,1}$ and $c_{k,2,2}$ are values equal to 0 or 1 and consequently introduce no polarity inversion or pulse amplification. This space-time code lends itself well to the modulation of an ultra-wide band signal.

It will be apparent to the man skilled in the art that similar expressions would be obtained using a DS-UWB signal according to expression (9) or even a DS-TH-UWB signal according to expression (10) instead of a TH-UWB signal.

FIG. 5 represents a multi-antenna transmitter system using a differential space-time code according to a first embodiment of the invention. In this embodiment, P=2 and the space-time code is given by (19).

The system 500 receives blocks of 2 information symbols $\sigma_k=(s_{k,1},s_{k,2})$ where $s_{k,1},s_{k,2}$ are 2-PPM symbols. The system 500 can, in general terms, receive words of 2 bits, the value of one bit giving a PPM position, for example 0 corresponds to the first PPM position and 1 corresponds to the second.

The block of information signals $\sigma_k=(s_{k,1},s_{k,2})$ undergoes a coding operation in the differential space-time encoder 510. More precisely the coder 510 first of all determines the elements of the matrix $S_k$ using (25), then calculates the matrix $C_k$ from $S_k$ and $C_{k-1}$ using the recurrence relationship (23). The coefficients of the matrix $C_{k-1}$ are stored in the delay element 525 so that they are available during coding of the block $\sigma_k$.

The 2 1×2 row vectors of the first row of $C_k$, that is ($c_{k,1,1}$ $c_{k,1,2}$), ($c_{k,2,1}$ $c_{k,2,2}$) are respectively transmitted to UWB modulators $530_1$ and $530_2$ via the multiplexer 520 in order to generate the first frame in accordance with (29) and (30), then the 2 1×2 row vectors of the first row of $C_k$, of the second row of $C_k$, that is ($c_{k,2,2}$ $c_{k,2,1}$), ($c_{k,1,1}$ $c_{k,1,2}$) in order to generate the second frames in accordance with (31) and (32). The pulse UWB signals modulated in this way are then transmitted to the radiative elements $540_1$ and $540_2$. These radiative elements may be UWB antennas or laser diodes or electroluminescent diodes which operate, for example, in the infra-red field, associated with electro-optical modulators.

The UWB signals transmitted by the system illustrated in FIG. 5 may be handled by a mono-antenna or multi-antenna receiver in accordance with the invention, which will now be described with reference to FIG. 6.

The receiver 600 includes Q' sensors 610, for example Q' photo-receivers, or as represented here Q' UWB receiver antennas. Each antenna (or sensor) is connected to a Rake filter 620 with L fingers for following the L multipaths of the propagation channel relating to this antenna. The Q=Q'L decision variables output from the Rake filter fingers are supplied to a calculation module 630. For a given antenna q'=1, . . . , Q' and a path l=1, . . . , L, $y_{k,i,q,m}$ is the decision variable for the m-th modulation position during the i-th symbol time of the k-th block time, with q=(q'−1)L+l.

The calculation module 630 first of all calculates, for each block time k and each symbol time i=1, . . . , P, the components of the row vectors $Y_{k,i}$ of size 1×2Q defined by:

$$Y_{k,i} = \sum_{q=1}^{Q} (y_{k,i,q,1} \quad y_{k,i,q,2}) \otimes e_q \quad (33)$$

where $e_q$ is a row vector of size Q defined as the q-th row vector of the identity matrix $I_Q$, of size Q×Q, that is $e_q=(\delta_{jq})_{j=1,\ldots,Q}$ where $\delta_{jq}=1$ if j=q and $\delta_{jq}=0$ otherwise.

The calculation module 630 then constructs the matrix $Y_k$ of size P×2QP defined by:

If P = 2:

$$Y_k = \begin{pmatrix} Y_{k,1} & Y_{k,2} \\ Y_{k,2}\Omega_Q & Y_{k,1} \end{pmatrix} \quad (34)$$

If P = 4:

$$Y_k = \begin{pmatrix} Y_{k,1} & Y_{k,2} & Y_{k,3} & Y_{k,4} \\ Y_{k,2}\Omega_Q & Y_{k,1} & Y_{k,4}\Omega_Q & Y_{k,2} \\ Y_{k,3}\Omega_Q & Y_{k,4} & Y_{k,1} & Y_{k,2}\Omega_Q \\ Y_{k,4}\Omega_Q & Y_{k,3}\Omega_Q & Y_{k,2} & Y_{k,1} \end{pmatrix} \quad (35)$$

If P = 8:

$$Y_k = \begin{pmatrix} Y_{k,1} & Y_{k,2} & Y_{k,3} & Y_{k,4} & Y_{k,5} & Y_{k,6} & Y_{k,7} & Y_{k,8} \\ Y_{k,2}\Omega_Q & Y_{k,1} & Y_{k,4} & Y_{k,3}\Omega_Q & Y_{k,6} & Y_{k,5}\Omega_Q & Y_{k,8}\Omega_Q & Y_{k,7} \\ Y_{k,3}\Omega_Q & Y_{k,4}\Omega_Q & Y_{k,1} & Y_{k,2} & Y_{k,7} & Y_{k,8} & Y_{k,5}\Omega_Q & Y_{k,6}\Omega_Q \\ Y_{k,4}\Omega_Q & Y_{k,3} & Y_{k,2}\Omega_Q & Y_{k,1} & Y_{k,8} & Y_{k,7}\Omega_Q & Y_{k,6} & Y_{k,5}\Omega_Q \\ Y_{k,5}\Omega_Q & Y_{k,6}\Omega_Q & Y_{k,7}\Omega_Q & Y_{k,8}\Omega_Q & Y_{k,1} & Y_{k,2} & Y_{k,3} & Y_{k,4} \\ Y_{k,6}\Omega_Q & Y_{k,5} & Y_{k,8}\Omega_Q & Y_{k,7} & Y_{k,2}\Omega_Q & Y_{k,1} & Y_{k,4}\Omega_Q & Y_{k,3} \\ Y_{k,7}\Omega_Q & Y_{k,8} & Y_{k,5} & Y_{k,6} & Y_{k,3}\Omega_Q & Y_{k,4} & Y_{k,1} & Y_{k,2}\Omega_Q \\ Y_{k,8}\Omega_Q & Y_{k,7}\Omega_Q & Y_{k,6}\Omega_Q & Y_{k,5} & Y_{k,4}\Omega_Q & Y_{k,3}\Omega_Q & Y_{k,2} & Y_{k,1} \end{pmatrix} \quad (36)$$

where $\Omega_Q$ is a matrix given by $\omega_Q = \Omega \otimes I_Q$ where $I_Q$ is the identity matrix of size Q×Q and $\Omega$ is the permutation matrix defined by (20).

At each block time k, the calculation module 630 transmits the matrix elements $Y_{k,i}$, i=1, ..., P and $Y_k$ to the detection module 640. The detection module estimates the symbols $s_{k,1}, s_{k,2}, \ldots, s_{k,P}$ of the block $\sigma_k$ using the following decision:

$$\hat{\sigma}_k = (\hat{s}_{k,1}, \hat{s}_{k,2}, \ldots, \hat{s}_{k,P}) \quad (37)$$
$$= \underset{s_{k,1}, s_{k,2}, \ldots, s_{k,P}}{\operatorname{argmax}} \{\operatorname{trace}(Y_{k,i}(S_k \otimes I_Q) Y_k^T)\}$$

where $Y_k^T$ is the transpose of $Y_k$ and $S_k$ is defined by (25), (26) or (27) depending on the value of P.

It can be seen that none of the expressions (33) to (37) use a propagation channel estimate, the decoding of the space-time code being achieved only by using the decision variable values $y_{k,i,q,m}$.

FIG. 7A shows the binary error rate curves (BER) as a function of the signal to noise ratio (SNR) for a UWB MIMO system using the space-time coding according to the invention, with a propagation channel not introducing interference between pulses. The separation between the two PMM positions is 100 ns, larger than the time spread of the UWB channel (less than 100 ns) The Rake filters are of order L=5.

The error rate curves are shown for a MISO system with two transmitter antennas (2×1), 720, and for a MISO system with four transmitter antennas (4×1), 730. As a comparison, there is also shown in 710 the error rate curve for a conventional mono-antenna system (1×1). The BER gain over the conventional mono-antenna system can be seen in both cases.

FIG. 7B shows the binary error rate curves (BER) as a function of the signal to noise ratio (SNR) for a UWB MIMO system using the space-time coding according to the invention, with a propagation channel which introduces interference between pulses. The separation between the two PMM positions is 5 ns, smaller than the time spread of the UWB channel (less than 100 ns). The Rake filters are also of the order L=5.

The error rate curves are shown for a MISO system with two transmitter antennas (2×1), 725, and for a MISO system with two transmitter antennas and two receiver antennas (2×2), 735. As a comparison, there is also shown in 715 the error rate curve for a conventional mono-antenna system (1×1). It can also be seen that a BER gain over the conventional mono-antenna system is also obtained in this case.

The invention claimed is:

1. Method of differential space-time coding for a ultra-wide band (UWB) transmitter system with two radiative elements where said method codes a block $\sigma_k = (S_{k,1}, S_{k,2})$ of information symbols which belong to a double pulse position modulation (2-PPM) modulation alphabet, into a sequence of two vectors with two components, the components of a vector being intended to position modulate a pulse UWB signal for a given radiative element of the said system and a given transmission channel use, each component corresponding to one pulse position modulation (PPM) modulation position, characterised in that said vectors are obtained from elements of the code matrix:

$$C_k = \begin{pmatrix} c_{k,1} & c_{k,2} \\ c_{k,2}\Omega & c_{k,1} \end{pmatrix}$$

where $C_k = \operatorname{sgn}(C_k^\circ - [\operatorname{Min}(C_k^\circ) \otimes u_1])$, $C_k^\circ = C_{k-1} S_k$, $u_1 = (1\ 1)$, $\otimes$ is the Kronecker product, sgn (X) is the matrix which gives the sign values of the elements of X, the sign value being respectively equal to −1,0,1 if the element is negative, of null value or positive, Min (X) is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} \\ s_{k,1}\Omega & s_{k,2}\Omega \\ s_{k,2}\Omega & s_{k,1} \\ s_{k,2} & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions.

2. Method of differential space-time coding for a ultra-wide band (UWB) transmitter system with four radiative elements where said method codes a block $\sigma_k = (S_{k,1}, S_{k,2}, S_{k,3}, S_{k,4})$ of four information symbols which belong to a double pulse position modulation (2-PPM) alphabet, in a sequence of four vectors with two components, the components of a vector being intended to position modulate a pulse UWB signal for a given radiative element of said system and a given transmission channel use, each component corresponding to one pulse position modulation (PPM) modulation position, characterised in that said vectors are obtained from elements of the code matrix:

$$C_k = \begin{pmatrix} c_{k,1} & c_{k,2} & c_{k,3} & c_{k,4} \\ c_{k,2}\Omega & c_{k,1} & c_{k,4}\Omega & c_{k,3} \\ c_{k,3}\Omega & c_{k,4} & c_{k,1} & c_{k,2}\Omega \\ c_{k,4}\Omega & c_{k,3}\Omega & c_{k,2} & c_{k,1} \end{pmatrix}$$

where $C_k = \text{Sgn}(C_k^o - [\text{Min}(C_k^o)\,,\, \otimes u_1])$, $C_k^o = C_{k-1}S_k$, $u_1 = (1\ 1)$, $\otimes$ is the Kronecker product, sgn (X) is the matrix which gives the sign values of the elements of X, the sign value being respectively equal to −1,0,1 if the element is negative, of null value or positive, Min (X) is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} & s_{k,3} & s_{k,4} \\ s_{k,1}\Omega & s_{k,2}\Omega & s_{k,3}\Omega & s_{k,4}\Omega \\ s_{k,2}\Omega & s_{k,1} & s_{k,4}\Omega & s_{k,3} \\ s_{k,2} & s_{k,1}\Omega & s_{k,4} & s_{k,3}\Omega \\ s_{k,3}\Omega & s_{k,4} & s_{k,1} & s_{k,2}\Omega \\ s_{k,3} & s_{k,4}\Omega & s_{k,1}\Omega & s_{k,2} \\ s_{k,4}\Omega & s_{k,3}\Omega & s_{k,2} & s_{k,1} \\ s_{k,4} & s_{k,3} & s_{k,2}\Omega & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions.

3. Method of differential space-time coding for a ultra-wide band (UWB) transmitter system with eight radiative elements where said method codes a block $\sigma_k = (S_{k,1}, S_{k,2}, S_{k,3}, S_{k,4}, S_{k,5}, S_{k,6}, S_{k,7}, S_{k,8})$ of eight information symbols which belong to a double pulse position modulation (2-PPM) alphabet, in a sequence of eight vectors with two components, with the components of a vector being intended to position modulate a pulse UWB signal for a given radiative element of the said system and a given transmission channel use, with each component corresponding to one pulse position modulation (PPM) modulation position, characterised by the fact that the said vectors are obtained from elements of the code matrix:

$$C_k = \begin{pmatrix} c_{k,1} & c_{k,2} & c_{k,3} & c_{k,4} & c_{k,5} & c_{k,6} & c_{k,7} & c_{k,8} \\ c_{k,2}\Omega & c_{k,1} & c_{k,4} & c_{k,3}\Omega & c_{k,6} & c_{k,5}\Omega & c_{k,8}\Omega & c_{k,7} \\ c_{k,3}\Omega & c_{k,4}\Omega & c_{k,1} & c_{k,2} & c_{k,7} & c_{k,8} & c_{k,5}\Omega & c_{k,6}\Omega \\ c_{k,4}\Omega & c_{k,3} & c_{k,2}\Omega & c_{k,1} & c_{k,8} & c_{k,7}\Omega & c_{k,6} & c_{k,5}\Omega \\ c_{k,5}\Omega & c_{k,6}\Omega & c_{k,7}\Omega & c_{k,8}\Omega & c_{k,1} & c_{k,2} & c_{k,3} & c_{k,4} \\ c_{k,6}\Omega & c_{k,5}\Omega & c_{k,8}\Omega & c_{k,7} & c_{k,2}\Omega & c_{k,1} & c_{k,4}\Omega & c_{k,3} \\ c_{k,7}\Omega & c_{k,8} & c_{k,5} & c_{k,6}\Omega & c_{k,3}\Omega & c_{k,4} & c_{k,1} & c_{k,2}\Omega \\ c_{k,8}\Omega & c_{k,7}\Omega & c_{k,6} & c_{k,5} & c_{k,4}\Omega & c_{k,3}\Omega & c_{k,2} & c_{k,1} \end{pmatrix}$$

where $C_k = \text{sgn}(C_k^o - [\text{Min}(C_k^o)\,\otimes\, u_1])$, $C_k^o = C_{k-1}S_k$, $u_1 = (1\ 1)$, $\otimes$ is the Kronecker product, sgn (X) is the matrix which gives the sign values of the elements of X, the sign value being respectively equal to −1,0,1 if the element is negative, of null value or positive, Min (X) is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} & s_{k,3} & s_{k,4} & s_{k,5} & s_{k,6} & s_{k,7} & s_{k,8} \\ s_{k,1}\Omega & s_{k,2}\Omega & s_{k,3}\Omega & s_{k,4}\Omega & s_{k,5}\Omega & s_{k,6}\Omega & s_{k,7}\Omega & s_{k,8}\Omega \\ s_{k,2}\Omega & s_{k,1} & s_{k,4} & s_{k,3}\Omega & s_{k,6} & s_{k,5}\Omega & s_{k,8}\Omega & s_{k,7} \\ s_{k,2} & s_{k,1}\Omega & s_{k,4}\Omega & s_{k,3} & s_{k,6}\Omega & s_{k,5} & s_{k,8} & s_{k,7}\Omega \\ s_{k,3}\Omega & s_{k,4}\Omega & s_{k,1} & s_{k,2} & s_{k,7} & s_{k,8} & s_{k,5}\Omega & s_{k,6}\Omega \\ s_{k,3} & s_{k,4} & s_{k,1}\Omega & s_{k,2}\Omega & s_{k,7}\Omega & s_{k,8}\Omega & s_{k,5} & s_{k,6} \\ s_{k,4}\Omega & s_{k,3} & s_{k,2}\Omega & s_{k,1} & s_{k,8} & s_{k,7}\Omega & s_{k,6} & s_{k,5}\Omega \\ s_{k,4} & s_{k,3}\Omega & s_{k,2} & s_{k,1}\Omega & s_{k,8}\Omega & s_{k,7} & s_{k,6}\Omega & s_{k,5} \\ s_{k,5}\Omega & s_{k,6}\Omega & s_{k,7}\Omega & s_{k,8}\Omega & s_{k,1} & s_{k,2} & s_{k,3} & s_{k,4} \\ s_{k,5} & s_{k,6} & s_{k,7} & s_{k,8} & s_{k,1}\Omega & s_{k,2}\Omega & s_{k,3}\Omega & s_{k,4}\Omega \\ s_{k,6}\Omega & s_{k,5} & s_{k,8}\Omega & s_{k,7} & s_{k,2}\Omega & s_{k,1} & s_{k,4}\Omega & s_{k,3} \\ s_{k,6} & s_{k,5}\Omega & s_{k,8} & s_{k,7}\Omega & s_{k,2} & s_{k,1}\Omega & s_{k,4} & s_{k,3}\Omega \\ s_{k,7}\Omega & s_{k,8} & s_{k,5} & s_{k,6}\Omega & s_{k,3}\Omega & s_{k,4} & s_{k,1} & s_{k,2}\Omega \\ s_{k,7} & s_{k,8}\Omega & s_{k,5}\Omega & s_{k,6} & s_{k,3} & s_{k,4}\Omega & s_{k,1}\Omega & s_{k,2} \\ s_{k,8}\Omega & s_{k,7}\Omega & s_{k,6} & s_{k,5} & s_{k,4}\Omega & s_{k,3}\Omega & s_{k,2} & s_{k,1} \\ s_{k,8} & s_{k,7} & s_{k,6}\Omega & s_{k,5}\Omega & s_{k,4} & s_{k,3} & s_{k,2}\Omega & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions.

4. Ultra-wide band (UWB) transmitter system with two radiative elements (540₁, 540₂), characterised in that it comprises:
coding means (510) for coding a block $\sigma s_k = (S_{k,1}, S_{k,2})$ of two information symbols which belong to a double pulse position modulation (2-PPM) alphabet, into a sequence of two vectors with two components, the components of a vector being intended to position modulate a pulse UWB signal for a given radiative element of the said system and a given transmission channel use, each component corresponding to one pulse position modulation (PPM) modulation position, the coding means obtaining said vectors from elements of the code matrix:

$$C_k = \begin{pmatrix} c_{k,1} & c_{k,2} \\ c_{k,2}\Omega & c_{k,1} \end{pmatrix}$$

where $C_k = \text{sgn}(C_k^o - [\text{Min}(C_k^o)\otimes u_1])$, $C_k^o = C_{k-1}S_k$, $u_1 = (1\ 1)$, $\otimes$ is the Kronecker product, sgn (X) is the matrix which gives the sign values of the elements of X, the sign value being respectively equal to −1,0,1 if the element is negative, of null value or positive, Min (X) is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} \\ s_{k,1}\Omega & s_{k,2}\Omega \\ s_{k,2}\Omega & s_{k,1} \\ s_{k,2} & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions;
two modulators (530₁, 530₂) for position modulating a pulse UWB signal, where each modulator is associated with a radiative element and modulates said signal position, during a use of the transmission channel, by using components of the vector associated with said radiative element and with said use of the channel;

where each radiative element ($540_1$, $540_2$) is adapted to transmit the signal thus modulated by the said associated channel modulator.

5. Ultra-wide band (UWB) transmitter system with four radiative elements, characterised in that it includes:

coding means (510) for coding a block $\sigma_k=(S_{k,1}, S_{k,2}, S_{k,3}, S_{k,4})$ of four information symbols which belong to a double pulse position modulation (2-PPM) alphabet, into a sequence of four vectors with two components, the components of a vector being intended to position modulate a pulse UWB signal for a given radiative element of the said system and a given transmission channel use, each component corresponding to one pulse position modulation (PPM) modulation position, the coding means obtaining said vectors from elements of the code matrix:

$$C_k = \begin{pmatrix} c_{k,1} & c_{k,2} & c_{k,3} & c_{k,4} \\ c_{k,2}\Omega & c_{k,1} & c_{k,4}\Omega & c_{k,3} \\ c_{k,3}\Omega & c_{k,4} & c_{k,1} & c_{k,2}\Omega \\ c_{k,4}\Omega & c_{k,3}\Omega & c_{k,2} & c_{k,1} \end{pmatrix}$$

where $C_k=\text{sgn}(C_k^o-[\text{Min}(C_k^o)\otimes u_1])$, $C_k^o=C_{k-1}S_k$, $u_1=(1\ 1)$, $\otimes$ is the Kronecker product, sgn (X) is the matrix which gives the sign values of the elements of X, the sign value being respectively equal to −1,0,1 if the element is negative, of null value or positive, Min(X) is a matrix whose elements give the lower values of two consecutive elements of a row of the matrix, X, $C_{k-1}$ is the code matrix for the previous block of information symbols and $$S_k = \begin{pmatrix} s_{k,1} & s_{k,2} & s_{k,3} & s_{k,4} \\ s_{k,1}\Omega & s_{k,2}\Omega & s_{k,3}\Omega & s_{k,4}\Omega \\ s_{k,2}\Omega & s_{k,1} & s_{k,4}\Omega & s_{k,3} \\ s_{k,2} & s_{k,1}\Omega & s_{k,4} & s_{k,3}\Omega \\ s_{k,3}\Omega & s_{k,4} & s_{k,1} & s_{k,2}\Omega \\ s_{k,3} & s_{k,4}\Omega & s_{k,1}\Omega & s_{k,2} \\ s_{k,4}\Omega & s_{k,3}\Omega & s_{k,2} & s_{k,1} \\ s_{k,4} & s_{k,3} & s_{k,2}\Omega & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions;

four modulators for position modulating a pulse UWB signal, where each modulator is associated with a radiative element and modulates the said signal position, during a use of the transmission channel, by using components of the vector associated with the said radiative element and with the said use of the channel;

where each radiative element is adapted to transmit the signal thus modulated by said associated modulator.

6. Ultra-wide band (UWB) transmitter system with eight radiative elements, characterised in that it includes:

coding means for coding a block $\sigma_k=(S_{k,1}, S_{k,2}, S_{k,3}, S_{k,4}, S_{k,5}, S_{k,6}, S_{k,7}, S_{k,8})$ of eight information symbols which belong to a double pulse position modulation (2-PPM) alphabet, in a sequence of eight vectors with two components, the components of a vector being intended to position modulate a pulse UWB signal for a given radiative element of said system and a given transmission channel use, each component corresponding to one pulse position modulation (PPM) modulation position, the coding means obtaining said vectors from elements of the code matrix:

$$C_k = \begin{pmatrix} c_{k,1} & c_{k,2} & c_{k,3} & c_{k,4} & c_{k,5} & c_{k,6} & c_{k,7} & c_{k,8} \\ c_{k,2}\Omega & c_{k,1} & c_{k,4} & c_{k,3}\Omega & c_{k,6} & c_{k,5}\Omega & c_{k,8}\Omega & c_{k,7} \\ c_{k,3}\Omega & c_{k,4}\Omega & c_{k,1} & c_{k,2} & c_{k,7} & c_{k,8} & c_{k,5}\Omega & c_{k,6}\Omega \\ c_{k,4}\Omega & c_{k,3} & c_{k,2}\Omega & c_{k,1} & c_{k,8} & c_{k,7}\Omega & c_{k,6} & c_{k,5}\Omega \\ c_{k,5}\Omega & c_{k,6}\Omega & c_{k,7}\Omega & c_{k,8}\Omega & c_{k,1} & c_{k,2} & c_{k,3} & c_{k,4} \\ c_{k,6}\Omega & c_{k,5}\Omega & c_{k,8}\Omega & c_{k,7} & c_{k,2}\Omega & c_{k,1} & c_{k,4}\Omega & c_{k,3} \\ c_{k,7}\Omega & c_{k,8} & c_{k,5} & c_{k,6}\Omega & c_{k,3}\Omega & c_{k,4} & c_{k,1} & c_{k,2}\Omega \\ c_{k,8}\Omega & c_{k,7}\Omega & c_{k,6} & c_{k,5} & c_{k,4}\Omega & c_{k,3}\Omega & c_{k,2} & c_{k,1} \end{pmatrix}$$

where $C_k=\text{sgn}(C_k^o-[\text{Min}(C_k^o)\otimes u_1])$, $C_k^o=C_{k-1}S_k$, $u_1=(1\ 1)$, $\otimes$ is the Kronecker product, sgn (X) is the matrix which gives the sign values of the elements of X, the sign value being respectively equal to −1,0,1 if the element is negative, of null value or positive, Min(X) is a matrix whose elements give the lower values of two consecutive elements of a row of the matrix X, $C_{k-1}$ is the code matrix for the previous block of information symbols and $$S_k = \begin{pmatrix} s_{k,1} & s_{k,2} & s_{k,3} & s_{k,4} & s_{k,5} & s_{k,6} & s_{k,7} & s_{k,8} \\ s_{k,1}\Omega & s_{k,2}\Omega & s_{k,3}\Omega & s_{k,4}\Omega & s_{k,5}\Omega & s_{k,6}\Omega & s_{k,7}\Omega & s_{k,8}\Omega \\ s_{k,2}\Omega & s_{k,1} & s_{k,4} & s_{k,3}\Omega & s_{k,6} & s_{k,5}\Omega & s_{k,8}\Omega & s_{k,7} \\ s_{k,2} & s_{k,1}\Omega & s_{k,4}\Omega & s_{k,3} & s_{k,6}\Omega & s_{k,5} & s_{k,8} & s_{k,7}\Omega \\ s_{k,3}\Omega & s_{k,4}\Omega & s_{k,1} & s_{k,2} & s_{k,7} & s_{k,8} & s_{k,5}\Omega & s_{k,6}\Omega \\ s_{k,3} & s_{k,4} & s_{k,1}\Omega & s_{k,2}\Omega & s_{k,7}\Omega & s_{k,8}\Omega & s_{k,5} & s_{k,6} \\ s_{k,4}\Omega & s_{k,3} & s_{k,2}\Omega & s_{k,1} & s_{k,8} & s_{k,7}\Omega & s_{k,6} & s_{k,5}\Omega \\ s_{k,4} & s_{k,3}\Omega & s_{k,2} & s_{k,1}\Omega & s_{k,8}\Omega & s_{k,7} & s_{k,6}\Omega & s_{k,5} \\ s_{k,5}\Omega & s_{k,6}\Omega & s_{k,7}\Omega & s_{k,8}\Omega & s_{k,1} & s_{k,2} & s_{k,3} & s_{k,4} \\ s_{k,5} & s_{k,6} & s_{k,7} & s_{k,8} & s_{k,1}\Omega & s_{k,2}\Omega & s_{k,3}\Omega & s_{k,4}\Omega \\ s_{k,6}\Omega & s_{k,5} & s_{k,8}\Omega & s_{k,7} & s_{k,2}\Omega & s_{k,1} & s_{k,4}\Omega & s_{k,3} \\ s_{k,6} & s_{k,5}\Omega & s_{k,8} & s_{k,7}\Omega & s_{k,2} & s_{k,1}\Omega & s_{k,4} & s_{k,3}\Omega \\ s_{k,7}\Omega & s_{k,8} & s_{k,5} & s_{k,6}\Omega & s_{k,3}\Omega & s_{k,4} & s_{k,1} & s_{k,2}\Omega \\ s_{k,7} & s_{k,8}\Omega & s_{k,5}\Omega & s_{k,6} & s_{k,3} & s_{k,4}\Omega & s_{k,1}\Omega & s_{k,2} \\ s_{k,8}\Omega & s_{k,7}\Omega & s_{k,6} & s_{k,5} & s_{k,4}\Omega & s_{k,3}\Omega & s_{k,2} & s_{k,1} \\ s_{k,8} & s_{k,7} & s_{k,6}\Omega & s_{k,5}\Omega & s_{k,4} & s_{k,3} & s_{k,2}\Omega & s_{k,1}\Omega \end{pmatrix}$$

a row of the matrix $C_k$ corresponding to a use of the transmission channel and a column of the matrix corresponding to a radiative element, where the matrix $C_k$ is defined to within a permutation of its rows and/or its columns and $\Omega$ being a permutation of the two PPM modulation positions;

eight modulators for position modulation of a pulse UWB signal, where each modulator is associated with a radiative element and modulates the said signal position, during a use of the transmission channel, by using components of the vector associated with said radiative element and with said use of the channel;

where each radiative element is adapted to transmit the signal thus modulated by said associated modulator.

7. Transmitter system according to one of claims 4 to 6, characterised in that the radiative elements are UWB antennas.

8. Transmitter system according to one of claims 4 to 6, characterised in that the radiative elements are laser diodes or electroluminescent diodes.

9. Transmitter system according to one of claims 4 to 6, characterised in that the pulse signal is a time-hopping ultra-wideband (TH-UWB) signal.

10. Transmitter system according to one of claims 4 to 6, characterised in that the pulse signal is a direct spread ultra-wideband (DS-UWBU) signal.

11. Transmitter system according to one of claims 4 to 6, characterised in that the pulse signal is a time-hopping direct spread ultra-wideband (TH-DS-UWB) signal.

12. UWB receiver system comprising a plurality (Q') of sensors (610) intended to receive a pulse UWB signal transmitted by a transmitter system according to one of claims 4 to 11, characterised in that:
- each sensor (610) is connected to a Rake filter (620) which is comprising a plurality (L) of fingers, with each finger corresponding to a multi-path of the propagation channel associated with this sensor, where each finger $q=1,\ldots,Q'L$ provides a decision variable value, $y_{k,i,q,m}$, for the m-th modulation position during the i-th symbol time of the k-th block time;
- a calculation module (630) which receives said decision variable values and calculates:
- for each block time k and each symbol time $i=1,\ldots,P$, the row vector $Y_{k,i}$ defined by $$Y_{k,i} = \sum_{q=1}^{Q} (y_{k,i,q,1} y_{k,i,q,2}) \otimes e_q$$

where $e_q$ is the q-th row vector of the identity matrix $I_Q$, of size $Q \times Q$;
- for each block time k, the matrix $Y_k$ of size $P \times 2QP$, where P is the number of antennas of the transmitter system, defined by:

If $P = 2$:

$$Y_k = \begin{pmatrix} Y_{k,1} & Y_{k,2} \\ Y_{k,2}\Omega_Q & Y_{k,1} \end{pmatrix}$$

If $P = 4$:

$$Y_k = \begin{pmatrix} Y_{k,1} & Y_{k,2} & Y_{k,3} & Y_{k,4} \\ Y_{k,2}\Omega_Q & Y_{k,1} & Y_{k,4}\Omega_Q & Y_{k,2} \\ Y_{k,3}\Omega_Q & Y_{k,4} & Y_{k,1} & Y_{k,2}\Omega_Q \\ Y_{k,4}\Omega_Q & Y_{k,3}\Omega_Q & Y_{k,2} & Y_{k,1} \end{pmatrix}$$

If $P = 8$:

$$Y_k = \begin{pmatrix} Y_{k,1} & Y_{k,2} & Y_{k,3} & Y_{k,4} & Y_{k,5} & Y_{k,6} & Y_{k,7} & Y_{k,8} \\ Y_{k,2}\Omega_Q & Y_{k,1} & Y_{k,4} & Y_{k,3}\Omega_Q & Y_{k,6} & Y_{k,5}\Omega_Q & Y_{k,8}\Omega_Q & Y_{k,7} \\ Y_{k,3}\Omega_Q & Y_{k,4}\Omega_Q & Y_{k,1} & Y_{k,2} & Y_{k,7} & Y_{k,8} & Y_{k,5}\Omega_Q & Y_{k,6}\Omega_Q \\ Y_{k,4}\Omega_Q & Y_{k,3} & Y_{k,2}\Omega_Q & Y_{k,1} & Y_{k,8} & Y_{k,7}\Omega_Q & Y_{k,6} & Y_{k,5}\Omega_Q \\ Y_{k,5}\Omega_Q & Y_{k,6}\Omega_Q & Y_{k,7}\Omega_Q & Y_{k,8}\Omega_Q & Y_{k,1} & Y_{k,2} & Y_{k,3} & Y_{k,4} \\ Y_{k,6}\Omega_Q & Y_{k,5} & Y_{k,8}\Omega_Q & Y_{k,7} & Y_{k,2}\Omega_Q & Y_{k,1} & Y_{k,4}\Omega_Q & Y_{k,3} \\ Y_{k,7}\Omega_Q & Y_{k,8} & Y_{k,5} & Y_{k,6} & Y_{k,3}\Omega_Q & Y_{k,4} & Y_{k,1} & Y_{k,2}\Omega_Q \\ Y_{k,8}\Omega_Q & Y_{k,7}\Omega_Q & Y_{k,6}\Omega_Q & Y_{k,5} & Y_{k,4}\Omega_Q & Y_{k,3}\Omega_Q & Y_{k,2} & Y_{k,1} \end{pmatrix}$$

where $\Omega_Q$ is a matrix given by $\Omega_Q = \Omega \otimes I_Q$ where $I_Q$ is the identity matrix of size $Q \times Q$ and $\Omega$ is the permutation matrix of the two PPM modulation positions,
- a detection module (640) which estimates the P information symbols transmitted during the block time k by $$(\hat{s}_{k,1}, \hat{s}_{k,2}, \ldots, \hat{s}_{k,P}) = \underset{s_{k,1},s_{k,2},\ldots,s_{k,P}}{\operatorname{argmax}} \{\operatorname{trace}(Y_{k,i}(S_k \otimes I_Q) Y_k^T)\}$$

where $\otimes$ is the Kronecker product and if $P = 2$, $S_k$ is given by:

$$S_k = \begin{pmatrix} s_{k,1} & s_{k,2} \\ s_{k,1}\Omega & s_{k,2}\Omega \\ s_{k,2}\Omega & s_{k,1} \\ s_{k,2} & s_{k,1}\Omega \end{pmatrix}$$

if $P = 4$, $S_k$ is given by:

$$S_k = \begin{pmatrix} s_{k,1} & s_{k,2} & s_{k,3} & s_{k,4} \\ s_{k,1}\Omega & s_{k,2}\Omega & s_{k,3}\Omega & s_{k,4}\Omega \\ s_{k,2}\Omega & s_{k,1} & s_{k,4}\Omega & s_{k,3} \\ s_{k,2} & s_{k,1}\Omega & s_{k,4} & s_{k,3}\Omega \\ s_{k,3}\Omega & s_{k,4} & s_{k,1} & s_{k,2}\Omega \\ s_{k,3} & s_{k,4}\Omega & s_{k,1}\Omega & s_{k,2} \\ s_{k,4}\Omega & s_{k,3}\Omega & s_{k,2} & s_{k,1} \\ s_{k,4} & s_{k,3} & s_{k,2}\Omega & s_{k,1}\Omega \end{pmatrix}$$

if $P = 8$, $S_k$ is given by:

$$S_k = \begin{pmatrix} s_{k,1} & s_{k,2} & s_{k,3} & s_{k,4} & s_{k,5} & s_{k,6} & s_{k,7} & s_{k,8} \\ s_{k,1}\Omega & s_{k,2}\Omega & s_{k,3}\Omega & s_{k,4}\Omega & s_{k,5}\Omega & s_{k,6}\Omega & s_{k,7}\Omega & s_{k,8}\Omega \\ s_{k,2}\Omega & s_{k,1} & s_{k,4} & s_{k,3}\Omega & s_{k,6} & s_{k,5}\Omega & s_{k,8}\Omega & s_{k,7} \\ s_{k,2} & s_{k,1}\Omega & s_{k,4}\Omega & s_{k,3} & s_{k,6}\Omega & s_{k,5} & s_{k,8} & s_{k,7}\Omega \\ s_{k,3}\Omega & s_{k,4}\Omega & s_{k,1} & s_{k,2} & s_{k,7} & s_{k,8} & s_{k,5}\Omega & s_{k,6}\Omega \\ s_{k,3} & s_{k,4} & s_{k,1}\Omega & s_{k,2}\Omega & s_{k,7}\Omega & s_{k,8}\Omega & s_{k,5} & s_{k,6} \\ s_{k,4}\Omega & s_{k,3} & s_{k,2}\Omega & s_{k,1} & s_{k,8} & s_{k,7}\Omega & s_{k,6} & s_{k,5}\Omega \\ s_{k,4} & s_{k,3}\Omega & s_{k,2} & s_{k,1}\Omega & s_{k,8}\Omega & s_{k,7} & s_{k,6}\Omega & s_{k,5} \\ s_{k,5}\Omega & s_{k,6}\Omega & s_{k,7}\Omega & s_{k,8}\Omega & s_{k,1} & s_{k,2} & s_{k,3} & s_{k,4} \\ s_{k,5} & s_{k,6} & s_{k,7} & s_{k,8} & s_{k,1}\Omega & s_{k,2}\Omega & s_{k,3}\Omega & s_{k,4}\Omega \\ s_{k,6}\Omega & s_{k,5} & s_{k,8}\Omega & s_{k,7} & s_{k,2}\Omega & s_{k,1} & s_{k,4}\Omega & s_{k,3} \\ s_{k,6} & s_{k,5}\Omega & s_{k,8} & s_{k,7}\Omega & s_{k,2} & s_{k,1}\Omega & s_{k,4} & s_{k,3}\Omega \\ s_{k,7}\Omega & s_{k,8} & s_{k,5} & s_{k,6}\Omega & s_{k,3}\Omega & s_{k,4} & s_{k,1} & s_{k,2}\Omega \\ s_{k,7} & s_{k,8}\Omega & s_{k,5}\Omega & s_{k,6} & s_{k,3} & s_{k,4}\Omega & s_{k,1}\Omega & s_{k,2} \\ s_{k,8}\Omega & s_{k,7}\Omega & s_{k,6} & s_{k,5} & s_{k,4}\Omega & s_{k,3}\Omega & s_{k,2} & s_{k,1} \\ s_{k,8} & s_{k,7} & s_{k,6}\Omega & s_{k,5}\Omega & s_{k,4} & s_{k,3} & s_{k,2}\Omega & s_{k,1}\Omega \end{pmatrix}$$

where $s_{k,1}, s_{k,2}, \ldots, s_{k,P}$ are the possible 2-PPM information symbols.

13. Receiver system according to claim 12, characterised in that the sensors are UWB antennas.

14. Receiver system according to claim 12, characterised in that the sensors are photo-detectors.

* * * * *

UNITED STATES PATENT AND TRADEMARK OFFICE
CERTIFICATE OF CORRECTION

PATENT NO. : 8,194,775 B2
APPLICATION NO. : 12/393594
DATED : June 5, 2012
INVENTOR(S) : Chadi Abou Rjeily It is certified that error appears in the above-identified patent and that said Letters Patent is hereby corrected as shown below:

Column 12 line 56, delete "Q" (third occurrence) and insert therefor --$\Omega$--

Column 19 line 16, delete "$\omega$" and insert therefor --$\Omega$--

Column 22 line 29, delete "$\sigma s_k$" and insert therefor --$\sigma_k$--

Signed and Sealed this
Thirteenth Day of November, 2012

David J. Kappos
*Director of the United States Patent and Trademark Office*